(12) United States Patent
Hayashi et al.

(10) Patent No.: US 8,818,190 B2
(45) Date of Patent: Aug. 26, 2014

(54) OPTICAL TRANSPORT SYSTEM AND OPTICAL NODE

(75) Inventors: Yukio Hayashi, Yokohama (JP); Kenro Sekine, Fuchu (JP); Yoshiyuki Niwa, Yokohama (JP); Shuuji Furumoto, Kamakura (JP)

(73) Assignee: Hitachi, Ltd., Tokyo (JP)

( * ) Notice: Subject to any disclaimer, the term of this patent is extended or adjusted under 35 U.S.C. 154(b) by 226 days.

(21) Appl. No.: 13/396,174

(22) Filed: Feb. 14, 2012

(65) Prior Publication Data

US 2012/0219289 A1    Aug. 30, 2012

(30) Foreign Application Priority Data

Feb. 25, 2011  (JP) ................................. 2011-040167

(51) Int. Cl.
*H04B 10/08*  (2006.01)
*H04B 10/00*  (2013.01)
*H04J 14/02*  (2006.01)

(52) U.S. Cl.
USPC ............................... 398/34; 398/94; 398/162

(58) Field of Classification Search
CPC ............ H04B 10/07955; H04B 10/564; H04J 14/0221
USPC ............................. 398/162, 137, 156, 94, 158
See application file for complete search history.

(56) References Cited

U.S. PATENT DOCUMENTS

| | | | | |
|---|---|---|---|---|
| 6,271,945 | B1 * | 8/2001 | Terahara ......................... | 398/26 |
| 7,113,700 | B2 * | 9/2006 | Shimizu et al. ................. | 398/33 |
| 7,725,033 | B2 * | 5/2010 | Nakamoto ..................... | 398/95 |
| 7,756,421 | B2 * | 7/2010 | Roberts et al. ................ | 398/158 |
| 2002/0048062 | A1 * | 4/2002 | Sakamoto et al. ............. | 359/124 |
| 2003/0147647 | A1 * | 8/2003 | Funami et al. ................. | 398/79 |
| 2004/0052524 | A1 * | 3/2004 | Arnold ............................ | 398/38 |
| 2008/0226291 | A1 * | 9/2008 | Onaka ............................ | 398/34 |
| 2010/0239263 | A1 * | 9/2010 | Tokura et al. .................. | 398/94 |
| 2011/0188851 | A1 * | 8/2011 | Oda et al. ....................... | 398/26 |

FOREIGN PATENT DOCUMENTS

| | | |
|---|---|---|
| JP | 08-321824 | 12/1996 |
| JP | 09-261205 | 10/1997 |

* cited by examiner

*Primary Examiner* — Ken Vanderpuye
*Assistant Examiner* — Mina Shalaby
(74) *Attorney, Agent, or Firm* — Foley & Lardner LLP

(57) ABSTRACT

An embodiment of the invention is an optical node configured to transmit/receive a wavelength-division-multiplexed signal. An optical monitoring unit monitors power levels of the wavelength-division-multiplexed signal on a wavelength-by-wavelength basis to acquire wavelength-by-wavelength power level values of the optical signals. A comparison arithmetic unit performs a comparison between each of the acquired wavelength-by-wavelength power level values of the optical signals, and a predetermined upper limit value and a predetermined lower limit value. A target value calculation unit determines target values of power levels at wavelengths whose acquired power level values exceed the upper limit value to be values between a center value and the upper limit value, and determines target values of power levels at wavelengths whose acquired power level values fall below the lower limit value to be values between the center value and the lower limit value.

8 Claims, 23 Drawing Sheets

POINT-TO-POINT

STAR NETWORK

RING NETWORK

MESH NETWORK

TERMINAL NODE

OADM NODE

OPTICAL REPEATER NODE

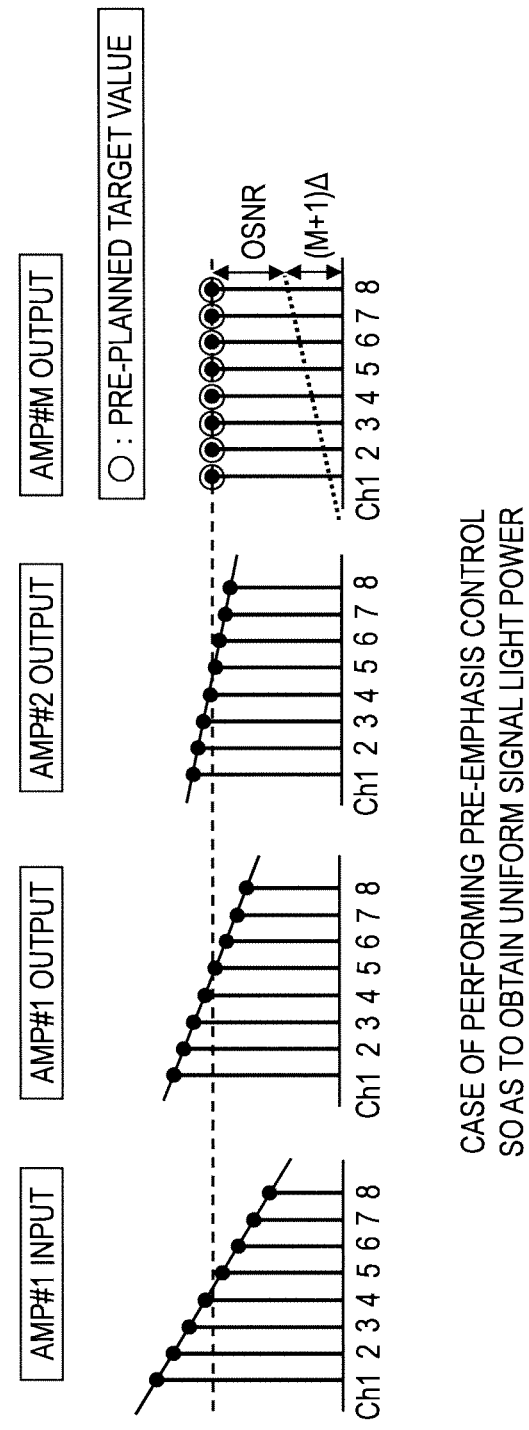

FIG. 5

| | AMP#1 | AMP#2 | ... | AMP#M |
|---|---|---|---|---|
| MINIMUM WAVELENGTH SIGNAL LIGHT POWER (LINEAR) | $GP\delta^{-1}$ | $GP\delta^{-2}$ | | $GP\delta^{-M}$ |
| MAXIMUM WAVELENGTH SIGNAL LIGHT POWER (LINEAR) | $GP\delta^{1}$ | $GP\delta^{2}$ | | $GP\delta^{M}$ |
| SIGNAL LIGHT POWER INTER-CHANNEL DEVIATION AMOUNT (LINEAR) | $\delta^{2}$ | $\delta^{4}$ | | $\delta^{2N}$ |
| SIGNAL LIGHT POWER INTER-CHANNEL DEVIATION AMOUNT (dB) | $2\Delta$ | $4\Delta$ | | $2M\Delta$ |
| MINIMUM WAVELENGTH NOISE LIGHT POWER (LINEAR) | $GN\delta^{-1}$ | $GN(\delta^{-2}+\delta^{-1})$ | | $GN\Sigma\delta^{-i}$ |
| MAXIMUM WAVELENGTH NOISE LIGHT POWER (LINEAR) | $GN\delta^{1}$ | $GN(\delta^{2}+\delta^{1})$ | | $GN\Sigma\delta^{i}$ |
| NOISE LIGHT POWER INTER-CHANNEL DEVIATION AMOUNT (LINEAR) | $\delta^{2}$ | $\delta^{3}$ | | $\delta^{M+1}$ |
| NOISE LIGHT POWER INTER-CHANNEL DEVIATION AMOUNT (dB) | $2\Delta$ | $3\Delta$ | | $(M+1)\Delta$ |
| MINIMUM WAVELENGTH OSNR (LINEAR) | $P/N$ | $P/N/(1+\delta^{1})$ | | $P/N/\Sigma\delta^{(M-1)}$ |
| MAXIMUM WAVELENGTH OSNR (LINEAR) | $P/N$ | $P/N/(1+\delta^{-1})$ | | $P/N/\Sigma\delta^{-(M-1)}$ |
| OSNR INTER-CHANNEL DEVIATION AMOUNT (LINEAR) | 1 | $\delta^{1}$ | | $\delta^{M-1}$ |
| OSNR INTER-CHANNEL DEVIATION AMOUNT (dB) | 0 | $\Delta$ | | $(M-1)\Delta$ |

POWER MONITOR VALUE AND CONTROL TARGET VALUE AT NODE M

AMP #1 INPUT LIGHT POWER AFTER CARRYING OUT ALC AT NODE 1

OSNR DEVIATION AMOUNT BEFORE AND
AFTER CARRYING OUT ALC AT NODE M

CALCULATION CONDITIONS: k=8, M=4, Gtilt = ±1.5dB, Pth = ±3.5dB, Ptarget = ±3.0dB

POWER MONITOR VALUE AND CONTROL TARGET VALUE AT NODE M

AMP #1 INPUT LIGHT POWER AFTER CARRYING OUT ALC AT NODE 1

OSNR DEVIATION AMOUNT BEFORE AND
AFTER CARRYING OUT ALC AT NODE M

CALCULATION CONDITIONS : k=16, M=4, Pth = ±3.5dB, Ptarget = ±3.0dB

Gtilt = ±0.0dB

Gtilt = ±0.5dB

Gtilt = ±1.0dB

Gtilt = ±1.5dB

Gtilt = ±2.0dB

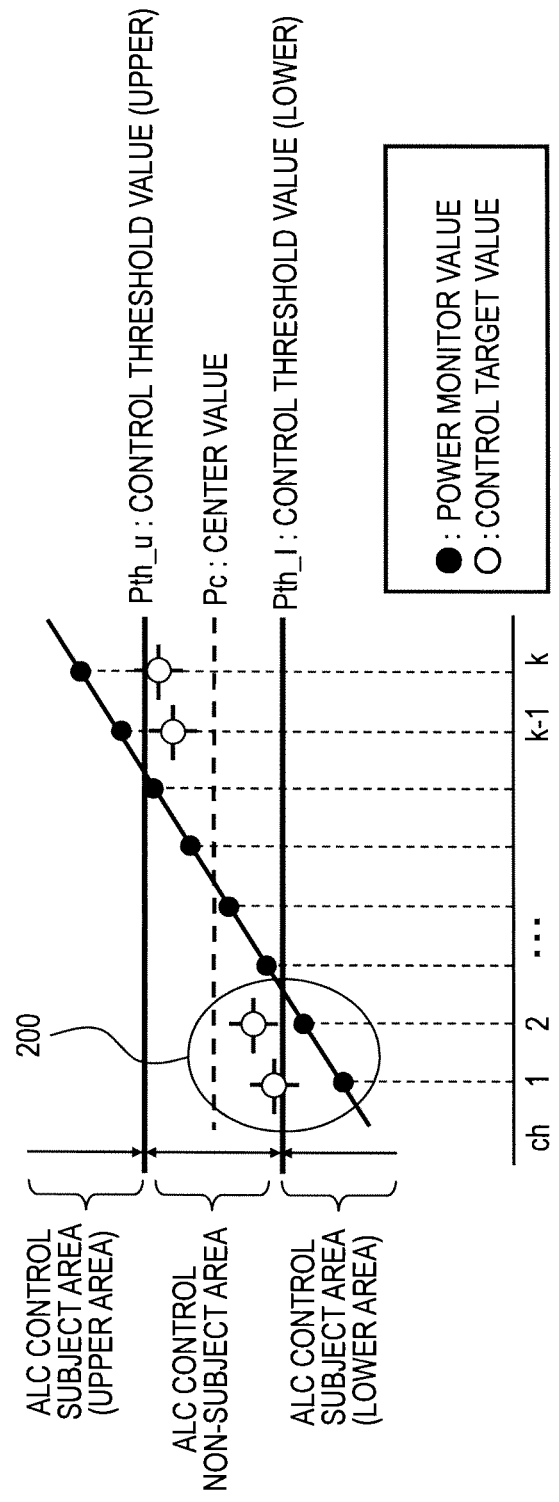

POWER MONITOR VALUE AND CONTROL TARGET VALUE AT NODE M

AMP #1 INPUT LIGHT POWER AFTER CARRYING OUT ALC AT NODE 1

OSNR DEVIATION AMOUNT BEFORE AND
AFTER CARRYING OUT ALC AT NODE M

CALCULATION CONDITIONS : k=16, M=4, Pth = ±3.5dB, Ptarget = Pmon x 1/2

Gtilt = ±0.0dB

Gtilt = ±1.5dB

Gtilt = ±2.0dB

OPTICAL TRANSPORT SYSTEM AND OPTICAL NODE

CLAIM OF PRIORITY

The present application claims priority from Japanese patent application JP2011-40167 filed on Feb. 25, 2011, the content of which is hereby incorporated by reference into this application.

BACKGROUND OF THE INVENTION

This invention relates to an optical transport system, in particular, an optical fiber transport system using a wavelength-division-multiplexing technology.

As data communications represented by the Internet become widespread, replacement of communication lines with optical ones (optical fibers) rapidly becomes widespread for access networks, metro networks, or core networks. In the optical fiber transport system, a wavelength-division-multiplexing (WDM) transmission technology for multiplexing a plurality of main signal wavelengths is introduced in order to realize high-capacity long-distance transmission.

Typical characteristics that serve as an index of transmission quality in the optical fiber transport system include optical signal-to-noise ratio (OSNR) characteristics defined by a ratio of an optical signal to an optical noise.

The OSNR characteristics depend on characteristics including at least one of a "characteristic parameter of a transmission device" (for example, an output light intensity of an optical transmitter, an amplifier gain of an optical repeater, optical losses in an optical multiplexer, an optical demultiplexer and/or an intensity of the optical noise generated in the optical repeater), a "loss in a transmission fiber between transmission devices" (for example, span loss in an optical fiber), and a "number of optical repeaters within the transmission device". If the characteristic of the "characteristic parameter of the transmission device" or the "loss in the transmission fiber between the transmission devices" cannot be uniformly obtained among wavelengths (channels), a deviation (disparity) occurs in the OSNR characteristics between wavelength channels.

On the other hand, in order to realize the transmission quality required in a system using the wavelength-division-multiplexing transmission technology (wavelength-division-multiplexing transport system), a predetermined OSNR must be ensured in a receiver located in the system. Therefore, the "loss in the transmission fiber between the transmission devices" or the "number of optical repeaters within the transmission device" is defined with reference to the channel whose OSNR becomes minimal in the wavelength-division-multiplexing transport system.

In other words, a transmission distance of the wavelength-division-multiplexing transport system is limited by the channel that exhibits the minimum OSNR. Therefore, there is a demand for improvement of the channel whose OSNR becomes minimal in the wavelength-division-multiplexing transport system. In other words, it is demanded to suppress an OSNR deviation between channels.

As a method of suppressing the OSNR deviation between channels, there is proposed a pre-emphasis technology that has an optical level adjustment function capable of adjusting optical power on a wavelength-by-wavelength (channel-by-channel) basis on an upstream side of a flow of the optical signal within the wavelength-division-multiplexing transport system and an OSNR monitor function of monitoring an OSNR on a wavelength-by-wavelength (channel-by-channel) basis on a downstream side of the optical signal within the wavelength-division-multiplexing transport system.

In the pre-emphasis technology, the optical level adjustment function is feedback-controlled based on a value of the OSNR measured by the OSNR monitor function. In other words, when a wavelength-division-multiplexed signal is transmitted to the OSNR monitor function, the optical level adjustment function is feedback-controlled in the pre-emphasis technology so that the OSNR characteristics between channels of the wavelength-division-multiplexed signal become uniform.

As a technology using the pre-emphasis technology, for example, Japanese Patent Application Laid-open No. Hei 8-321824 discloses a technology in which: "a pre-emphasis controller resets pre-emphasis amount setting devices and transmits wavelength-division-multiplexed signals; an optical signal-to-noise ratio measuring device measures optical signal-to-optical noise ratios of the respective wavelength-division-multiplexed signals and feeds back the optical signal-to-optical noise ratios to the pre-emphasis controller; the pre-emphasis controller automatically sets a pre-emphasis amount of the pre-emphasis amount setting devices based on the above-mentioned information; a line monitor device detects which optical amplifier's performance is deteriorated; and the pre-emphasis controller automatically controls the pre-emphasis amount of the pre-emphasis amount setting devices based on the detected information".

Further, as another technology using the pre-emphasis technology, for example, Japanese Patent Application Laid-open No. Hei 9-261205 discloses a technology for "providing a system including: a first terminal that outputs WDM signal light by wavelength-division-multiplexing signal light beams of a plurality of channels having mutually different wavelengths; a second terminal that receives the WDM signal light; and an optical transmission line laid between the first terminal and the second terminal, in which: the second terminal has a function of monitoring signal-to-noise ratios of the respective channels based on the received WDM signal light; the optical transmission line includes a first line for transmitting the WDM signal light from the first terminal to the second terminal and a second line for transmitting a supervisory control signal related to the monitored signal-to-noise ratios from the second terminal to the first terminal; and the first terminal includes means for receiving the supervisory control signal and controlling power of the respective signal light beams based on the supervisory control signal so that the signal-to-noise ratios of the respective channels at the second terminal become the same".

The pre-emphasis technology for monitoring an OSNR and suppressing the OSNR deviation between channels needs to include the function of monitoring the OSNR. Therefore, as a result of using the pre-emphasis technology, there occurs a problem of causing an increase in the size of the device and an increase in costs for operating the device.

Methods of monitoring signal light power of the respective channels (wavelengths) include a power monitoring method of splitting the wavelength-division-multiplexed signal into respective wavelengths by an optical demultiplexing function of an optical band-pass filter, an arrayed waveguide grating (AWG), or the like and receiving light of the respective optical signals obtained by the splitting by using photodiodes (PDs).

To monitor the OSNR by those methods, in other words, a power ratio of the signal light power to noise light power, it is necessary to monitor the noise light power as well as the signal light power at the same time. Here, of noise light in the wavelength-division-multiplexing transport system, the noise light output from a light source and the noise light (amplified spontaneous emission (ASE)) output from an optical amplifier located in the transport system are dominant.

In the power monitoring method of receiving the optical signal split on a wavelength-by-wavelength basis by using the PDs by the optical demultiplexing function described above, it is impossible to split the noise light from the signal light or monitor the respective powers obtained by the splitting. Therefore, it is necessary to provide a function of improving a wavelength resolution of the above-mentioned optical demultiplexing function to an extent that allows the noise light to be split from the signal light and monitoring the respective optical powers of the signal light and the noise light.

A general function of monitoring the respective optical powers of the signal light and the noise light is realized by a device such as an optical spectrum analyzer. The optical spectrum analyzer is a device that measures the optical signal by sweeping an optical receiver and a diffraction grating located immediately in front thereof or the optical band-pass filter in a wavelength axis direction and splitting the noise light power from the signal light power with high wavelength resolution. Also in Japanese Patent Application Laid-open No. Hei 8-321824, the optical spectrum analyzer is used as an OSNR monitor.

However, the optical spectrum analyzer is realized by making the most of an advanced control technology for sweeping the diffraction grating or the optical band-pass filter in the wavelength axis direction with high resolution and high precision and an optical filter technology having steep and high-precision wavelength characteristics. Therefore, compared to the general power monitoring method of receiving the optical signal split on a wavelength-by-wavelength basis by using the PDs by the optical demultiplexing function, the optical spectrum analyzer is expensive and hard to integrate, and a device equipped with the optical spectrum analyzer leads to a problem of causing an increase in the costs of the device and an increase in the size of the device.

In addition, as an alternative method to the above-mentioned OSNR monitor, Japanese Patent Application Laid-open No. Hei 9-261205 discloses a method of monitoring an electrical SNR. In the monitoring of the electrical SNR, an SNR can be monitored in an equivalent manner by measuring a Q factor (quality factor). On the other hand, it is necessary to provide an advanced and high-speed signal processing circuit for performing a signal processing for calculating a statistical distribution of signal power levels after converting the optical signal into an electrical signal, a processing for estimating the transmission quality from a partial signal included in original information after decoding the original information from the signal, or other such processing. Therefore, the monitoring of the electrical SNR leads to a problem of causing an increase in the costs of the device.

SUMMARY OF THE INVENTION

This invention has been made in view of the above-mentioned problems, and an object thereof is to realize pre-emphasis control that suppresses an OSNR deviation between channels without using an expensive OSNR monitor by using a power level monitoring method that exhibits high stability and high reliability independently of the number of wavelengths and the wavelength layout and of fluctuations in characteristic parameter of a transmission device or a transmission fiber.

A representative aspect of this invention is an optical transport system, comprising a plurality of optical nodes each of which transmits/receives a wavelength-division-multiplexed signal comprising optical signals of different wavelengths via an optical fiber. The plurality of optical nodes each comprises an optical amplifying unit configured to amplify the wavelength-division-multiplexed signal, and a control signal transmission/reception unit configured to transmit/receive a control signal. A first optical node in the plurality of optical nodes is configured to transmit the wavelength-division-multiplexed signal to a second optical node in the plurality of optical nodes. The first optical node comprises an optical control unit configured to change power levels of the wavelength-division-multiplexed signal on a wavelength-by-wavelength basis. The second optical node comprises an optical monitoring unit configured to monitor the power levels of the wavelength-division-multiplexed signal transmitted from the first optical node on a wavelength-by-wavelength basis to acquire wavelength-by-wavelength power level values of the optical signals, a comparison arithmetic unit configured to perform a comparison between each of the acquired wavelength-by-wavelength power level values of the optical signals, and a predetermined upper limit value and a predetermined lower limit value, and a target value calculation unit configured to generate wavelength-by-wavelength target values of the power levels of the optical signals based on results of the comparison. The target value calculation unit is configured to obtain a center value of the power levels of the wavelength-division-multiplexed signal based on the wavelength-by-wavelength power level values of the optical signals acquired by the optical monitoring unit, determine target values of power levels at wavelengths whose acquired power level values exceed the predetermined upper limit value as a result of the comparison performed by the comparison arithmetic unit to be first values between the center value and the predetermined upper limit value for, and determine target values of power levels at wavelengths whose acquired power level values fall below the predetermined lower limit value as a result of the comparison performed by the comparison arithmetic unit to be second values between the center value and the predetermined lower limit value. The second optical node comprises a second control signal transmission/reception unit configured to transmit a first control signal comprising the generated target values to a first control signal transmission/reception unit of the first optical node. The optical control unit of the first optical node is configured to change the power levels of the wavelength-division-multiplexed signal on a wavelength-by-wavelength basis according to the target values included in the first control signal transmitted by the second control signal transmission/reception unit.

According to the representative aspect of this invention, it is possible to realize the pre-emphasis control that suppresses an OSNR deviation between channels without using an expensive OSNR monitor.

BRIEF DESCRIPTION OF THE DRAWINGS

The above and other objects, advantages and features of the present invention will be more apparent from the following description taken in conjunction with the accompanying drawings, in which:

FIG. 4B is an explanatory diagram illustrating the input/output spectra at the respective optical amplifiers in a case where the pre-emphasis control is performed so that signal light power becomes uniform at a monitor node according to the first embodiment of this invention;

FIG. 5 is an explanatory diagram illustrating inter-channel deviation amounts of the signal light power, noise light power, and the OSNR according to the first embodiment of this invention;

FIG. 13A is an explanatory diagram illustrating a method of calculating ch-by-ch control target values according to a second embodiment of this invention;

DETAILED DESCRIPTION OF THE PREFERRED EMBODIMENTS

Hereinafter, embodiments of this invention are described with reference to the accompanying drawings.

First Embodiment

Referring to FIGS. 1A to 1D to FIGS. 12A to 12E, description is made of a first embodiment of this invention.

FIG. 1A to FIG. 1D are block diagrams illustrating network configurations according to the first embodiment of this invention.

Figure 1A:
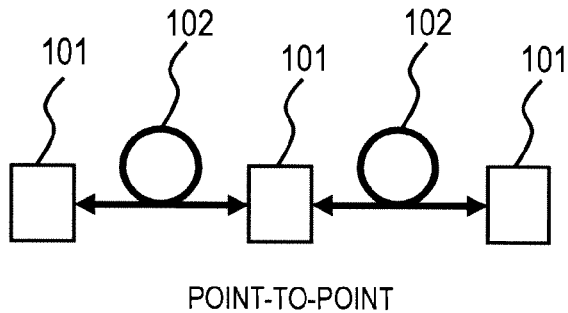
FIG. 1A is a block diagram illustrating a physical configuration of a point-to-point optical network according to a first embodiment of this invention.

FIG. 1A is a block diagram illustrating a physical configuration of a point-to-point optical network according to the first embodiment of this invention.

The point-to-point optical network of FIG. 1A includes a plurality of optical nodes 101 and a plurality of optical fibers 102 that couple the respective optical nodes 101 on a one-to-one basis. Although not shown in FIG. 1A, each of the optical nodes 101 is an optical transmission device including a communication device such as a router. Therefore, two optical nodes 101 located in remote sites can communicate with each other by being coupled to the optical network of FIG. 1A.

The respective optical nodes 101 located at both terminals of the optical network of FIG. 1A convert a plurality of electrical signals received from an external portion of the optical network into a plurality of optical signals, and transmit the plurality of optical signals obtained by the conversion to the optical network. Further, the respective optical nodes 101 convert the plurality of optical signals received from the optical network into a plurality of electrical signals, and transmit the plurality of electrical signals obtained by the conversion to the external portion of the optical network.

Therefore, each of the plurality of optical nodes 101 located between the terminal and the terminal of the optical network of FIG. 1A is a wavelength-division-multiplexing (WDM) device that multiplexes/demultiplexes and transmits/receives signals having a plurality of different wavelengths or an optical add drop multiplexer (OADM) device that allows inserting (adding) and demultiplexing (dropping) of an optical signal.

Figure 1B:
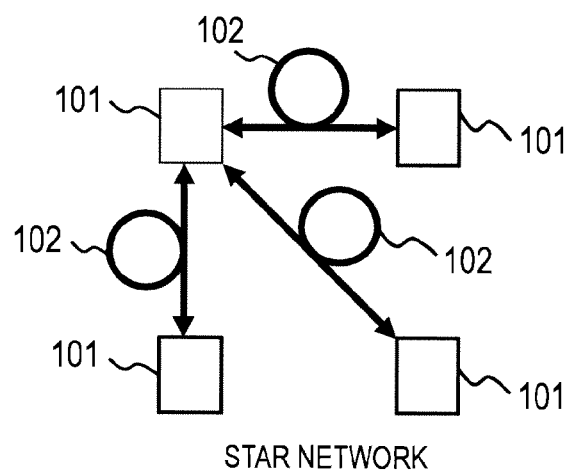
FIG. 1B is a block diagram illustrating a physical configuration of a star network according to the first embodiment of this invention.

FIG. 1B is a block diagram illustrating a physical configuration of a star network according to the first embodiment of this invention.

The star network of FIG. 1B includes the optical node 101 coupled to at least three other optical nodes 101. The respective optical nodes 101 are coupled to each other by the optical fibers 102.

Figure 1C:
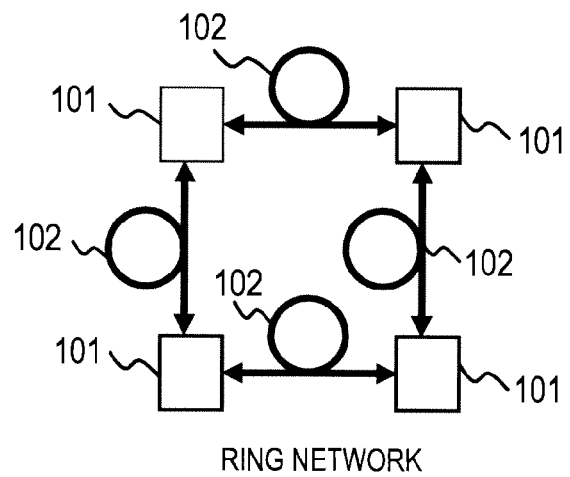
FIG. 1C is a block diagram illustrating a physical configuration of a ring network according to the first embodiment of this invention.

FIG. 1C is a block diagram illustrating a physical configuration of a ring network according to the first embodiment of this invention.

The ring network of FIG. 1C is a network obtained by coupling the plurality of optical nodes 101 and the plurality of optical fibers 102 to each other in a ring shape.

The optical nodes 101 of FIG. 1B and FIG. 1C each include a WDM device or an OADM device.

Figure 1D:
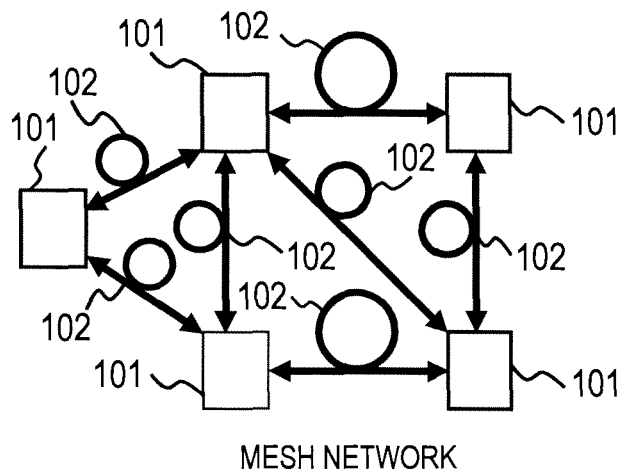
FIG. 1D is a block diagram illustrating a physical configuration of a mesh network according to the first embodiment of this invention.

FIG. 1D is a block diagram illustrating a physical configuration of a mesh network according to the first embodiment of this invention.

Each of the optical nodes 101 of FIG. 1D is a WDM device, an OADM device, or an optical cross-connect device.

Figure 2A:
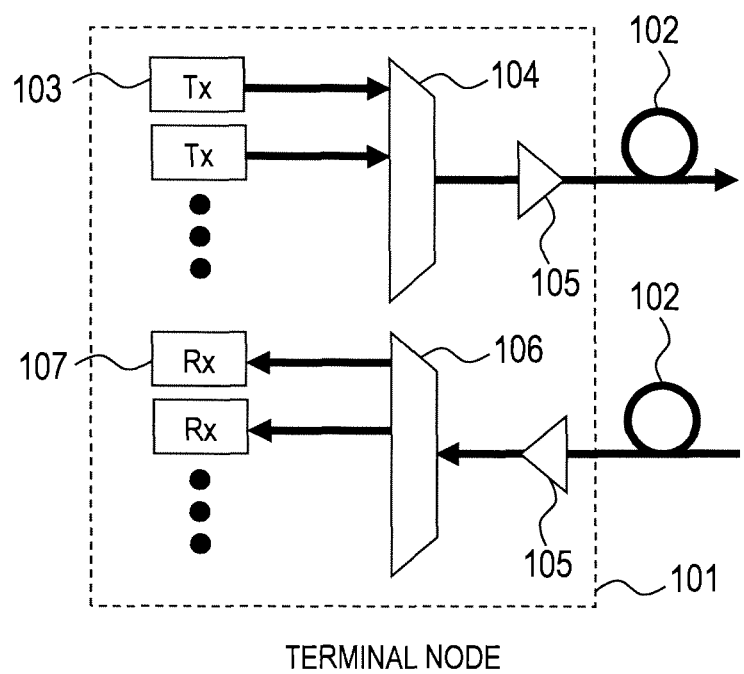
FIG. 2A is a block diagram illustrating a physical configuration of an optical node coupled to a terminal within an optical network according to the first embodiment of this invention.
Figure 2B:
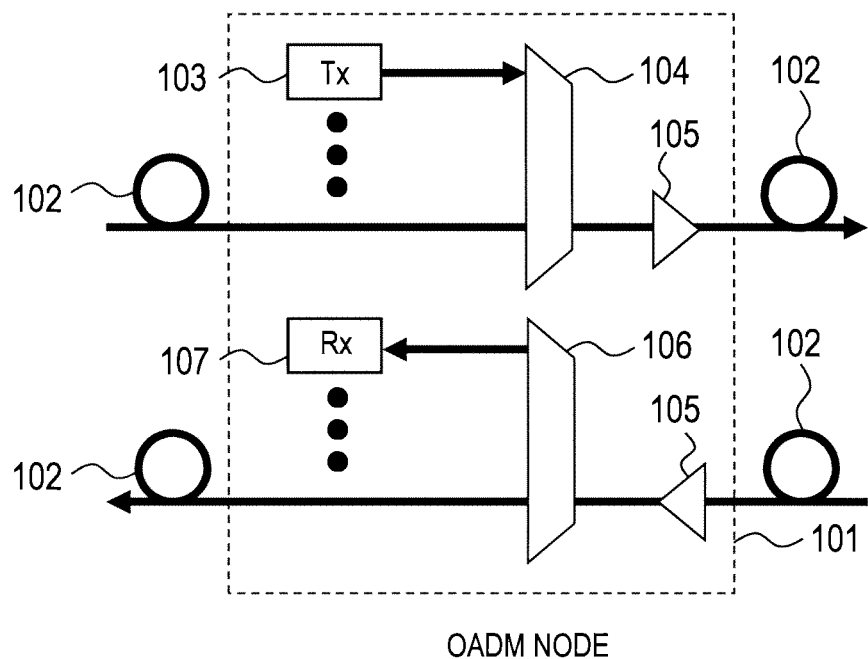
FIG. 2B is a block diagram illustrating a physical configuration of the optical node in a case where the optical node is an OADM device according to the first embodiment of this invention.
Figure 2C:
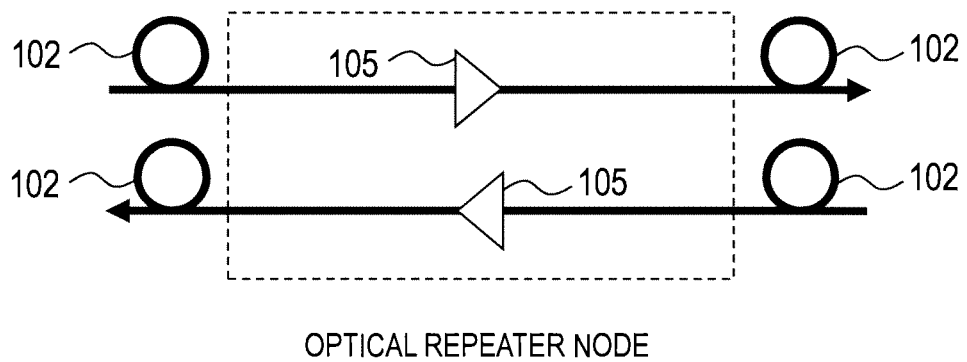
FIG. 2C is a block diagram illustrating a physical configuration of another optical node according to the first embodiment of this invention.

FIG. 2A to FIG. 2C are block diagrams illustrating physical configurations of the optical node 101 according to the first embodiment of this invention.

FIG. 2A is a block diagram illustrating the physical configuration of the optical node 101 coupled to the terminal within an optical network according to the first embodiment of this invention.

On its transmitting side, the optical node 101 (terminal node) coupled to the terminal of the optical network illustrated in FIG. 2A includes a plurality of optical transmitters 103, an optical multiplexer 104, and an optical amplifier 105. The plurality of optical transmitters 103 included in each of the optical nodes 101 output a plurality of optical signals, and the output signals are wavelength-division-multiplexed by one optical multiplexer 104. An optical signal obtained by the wavelength-division-multiplexing (wavelength-division-multiplexed signal) is amplified by the optical amplifier 105 and transmitted to the optical fiber 102.

Further, the terminal node includes on its receiving side the optical amplifier 105, an optical demultiplexer 106, and a plurality of optical receivers 107. The wavelength-division-multiplexed signal transmitted from the optical fiber 102 is amplified by the optical amplifier 105. Then, the amplified wavelength-division-multiplexed signal is transmitted to the optical receivers 107 after being demultiplexed by the optical demultiplexer 106 on a wavelength-by-wavelength basis.

FIG. 2B is a block diagram illustrating the physical configuration of the optical node 101 in a case where the optical node 101 is an OADM device according to the first embodiment of this invention.

In a case where the optical node 101 is an OADM device, the optical node 101 receives the wavelength-division-multiplexed signal from the optical fiber 102, processes the received wavelength-division-multiplexed signal, and transmits the processed wavelength-division-multiplexed signal to another optical fiber 102.

The optical node 101 illustrated in FIG. 2B is the optical node 101 coupled by at least two optical fibers 102 illustrated in FIG. 1A to FIG. 1C.

The optical node 101 of FIG. 2B uses the optical multiplexer 104 to insert (add) optical signals transmitted from the optical transmitters 103 to the wavelength-division-multiplexed signal transmitted from the optical fiber 102. Then, the optical node 101 of FIG. 2B uses the optical amplifier 105 to amplify the wavelength-division-multiplexed signal to which the optical signals have been inserted, and then transmits the amplified wavelength-division-multiplexed signal to the adjacent optical node 101 via the optical fiber 102.

Further, the optical node 101 of FIG. 2B uses the optical amplifier 105 to amplify the wavelength-division-multiplexed signal transmitted from the optical fiber 102. After that, the optical node 101 of FIG. 2B uses the optical demultiplexer 106 to demultiplex (drop) the amplified wavelength-division-multiplexed signal into the wavelength-division-multiplexed signal to be transmitted the optical multiplexer 104 included in the adjacent optical node 101 and the other wavelength-division-multiplexed signal. Then, the optical node 101 of FIG. 2B transmits the demultiplexed wavelength-division-multiplexed signals to the optical multiplexer 104 of the adjacent optical node 101.

It should be noted that the optical node 101 (OADM device) of FIG. 2B may include a function of a reconfigurable-OADM (ROADM) of changing wavelength channels to be inserted or demultiplexed from a remote site by having a switching function added to the optical multiplexer 104 and the optical demultiplexer 106.

FIG. 2C is a block diagram illustrating the physical configuration of another optical node 101 according to the first embodiment of this invention.

The optical node 101 of FIG. 2C is the optical node 101 being an optical repeater node coupled by at least two optical fibers 102 illustrated in FIG. 1A to FIG. 1C. The optical repeater node uses the optical amplifier 105 to amplify the wavelength-division-multiplexed signal transmitted from the optical fiber 102, and transmits the amplified wavelength-division-multiplexed signal to another optical fiber 102.

Figure 3:
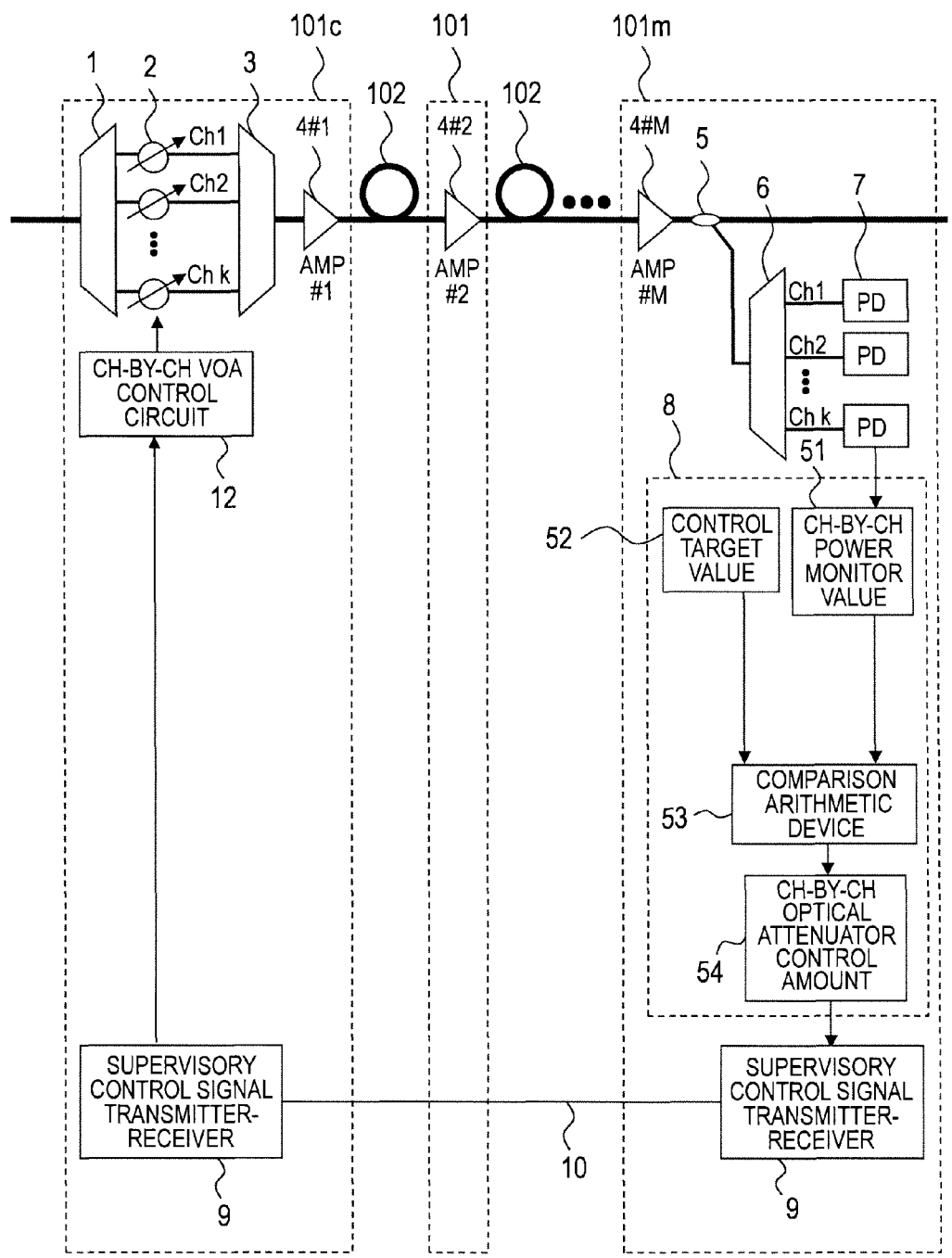
FIG. 3 is a block diagram illustrating a basic configuration of a wavelength-division-multiplexing transport system that performs pre-emphasis control based on power level monitoring according to the first embodiment of this invention.

FIG. 3 is a block diagram illustrating a basic configuration of a wavelength-division-multiplexing transport system that performs pre-emphasis control based on power level monitoring according to the first embodiment of this invention.

The pre-emphasis control based on the power level monitoring according to this embodiment means the pre-emphasis control performed without using an OSNR monitor. The system that performs the pre-emphasis control according to this embodiment includes a control node 101c and a monitor node 101m. The control node 101c and the monitor node 101m are the optical nodes 101.

The optical node 101 includes a processor such as a CPU, a memory, an auxiliary storage unit, and an input/output device. Each of the optical nodes 101 use the processor to execute each function and expand data or a program in the memory.

The control node 101c has a function for changing power levels of the optical signal on a channel-by-channel basis in order to perform the pre-emphasis control. The monitor node 101m has a function for monitoring the power levels of the optical signal on a channel-by-channel basis in order to perform the pre-emphasis control.

The control node 101c includes an optical demultiplexer 1, a plurality of ch-by-ch variable optical attenuators (VOAs) 2, an optical multiplexer 3, an optical amplifier 4#1, a supervisory control signal transmitter-receiver 9, and a the ch-by-ch variable optical attenuator control circuit 12.

The optical demultiplexer 1 is the same as the optical demultiplexer 106 of FIG. 2A and FIG. 2B. The optical multiplexer 3 is the same as the optical multiplexer 104 of FIG. 2A and FIG. 2B. The optical amplifier 4 is the same as the optical amplifier 105 of FIG. 2A to FIG. 2C.

The ch-by-ch variable optical attenuators 2 control the respective optical signals obtained by the demultiplexing by the optical demultiplexer 1 on a wavelength-by-wavelength basis so as to exhibit uniform power levels. The supervisory control signal transmitter-receiver 9 receives a control signal transmitted from the monitor node 101m, and transmits the received control signal to the ch-by-ch variable optical attenuator control circuit 12.

The supervisory control signal transmitter-receiver 9 serves as a function included in the control node 101c, the monitor node 101m, and the optical nodes 101 between the control node 101c and the monitor node 101m. The supervisory control signal transmitter-receiver 9 has a function for transmitting/receiving the control signal between the supervisory control signal transmitter-receivers 9.

In accordance with the received control signal, the ch-by-ch variable optical attenuator control circuit 12 causes the ch-by-ch variable optical attenuators 2 to retain target values of the power levels of the optical signals having the respective wavelengths. With this configuration, the ch-by-ch variable optical attenuators 2 control the optical signals having the respective wavelengths in accordance with the target values of the power levels.

For example, when the wavelength-division-multiplexed signal whose number of wavelengths (in other words, number of channels) is k is transmitted to the control node 101c, the optical demultiplexer 1 demultiplexes the transmitted wavelength-division-multiplexed signal into the optical signal on a wavelength-by-wavelength basis. Then, the ch-by-ch variable optical attenuators 2 change the power levels of the optical signals having the respective wavelengths obtained by the demultiplexing, and transmit the optical signals with the power levels changed to the optical multiplexer 3.

The optical multiplexer 3 multiplexes the respective optical signals that have been transmitted into the wavelength-division-multiplexed signal. The wavelength-division-multiplexed signal obtained by the multiplexing is transmitted to the optical fiber 102 after being amplified by the optical amplifier 4#1.

The optical nodes 101 whose number is (M−2) are provided within a network between the control node 101c and the monitor node 101m. Then, the respective optical nodes 101 include optical amplifiers 4 (optical amplifiers 4#2 to 4#(M−1)).

Located between the control node 101c and the monitor node 101m are M optical amplifiers 4 (optical amplifiers 4#1 to 4#M) including the optical amplifiers 4 included in the control node 101c and the monitor node 101m. In a case where an inter-channel deviation exists between gains (wavelength dependence of gains) of the respective optical amplifiers 4, the inter-channel deviation in the OSNR occurs in the wavelength-division-multiplexed signal transmitted to the monitor node 101m.

The monitor node 101m includes the optical amplifier 4#M, an optical coupler 5, an optical demultiplexer 6, a plurality of photodiodes (PDs) 7, a variable optical attenuator control amount arithmetic circuit 8, and the supervisory control signal transmitter-receiver 9. The optical coupler 5 is a device that causes the wavelength-division-multiplexed signal transmitted to the monitor node 101m to branch off.

The optical demultiplexer 6 included in the monitor node 101m is the same as the optical demultiplexer 1 included in the control node 101c. The PDs 7 are devices that receive the optical signals obtained by the demultiplexing by the optical demultiplexer 6 on a wavelength-by-wavelength basis and measure the power levels of the received optical signals.

The variable optical attenuator control amount arithmetic circuit 8 has a function for calculating a ch-by-ch variable optical attenuator control amount 54 used for performing the pre-emphasis control, and includes a comparison arithmetic device 53. The comparison arithmetic device 53 calculates the ch-by-ch variable optical attenuator control amount 54 based on the values of the power levels measured by the PDs 7. The ch-by-ch variable optical attenuator control amount 54 has values that indicate the power levels by which the optical signal is controlled by the ch-by-ch variable optical attenuator 2 of the control node 101c.

The supervisory control signal transmitter-receiver 9 included in the monitor node 101m has the same function as the supervisory control signal transmitter-receiver 9 included in the control node 101c. Further, the supervisory control signal transmitter-receiver 9 included in the monitor node 101m causes the control signal to include the ch-by-ch variable optical attenuator control amount 54 calculated by the comparison arithmetic device 53, and transmits the control signal including the ch-by-ch variable optical attenuator control amount 54 to the control node 101c via a supervisory control signal transmission line 10.

When the wavelength-division-multiplexed signal is transmitted to the monitor node 101m, the wavelength-division-multiplexed signal is amplified by the optical amplifier 4#M, and then part thereof is caused to branch off by the optical coupler 5. Then, the wavelength-division-multiplexed signal that has branched off is transmitted to the optical demultiplexer 6 and demultiplexed into the optical signals on a wavelength-by-wavelength basis by the optical demultiplexer 6. The optical demultiplexer 6 transmits the optical signals obtained by the demultiplexing to the photodiodes (PDs) 7 located on a wavelength-by-wavelength basis.

The PDs 7 measure the power levels of the respective optical signals that have been transmitted, and acquire ch-by-ch power monitor values 51 as measurement results on a wavelength-by-wavelength basis. Then, the respective ch-by-ch power monitor values 51 that have been acquired are transmitted to the comparison arithmetic device 53 of the variable optical attenuator control amount arithmetic circuit 8. In the variable optical attenuator control amount arithmetic circuit 8, the comparison arithmetic device 53 performs a comparison arithmetic operation between the respective ch-by-ch power monitor values 51 and ch-by-ch control target values 52 to calculate the ch-by-ch variable optical attenuator control amount 54.

Each of the ch-by-ch control target values 52 is a value defined by an administrator or the like in advance and is retained in the memory or the like of the monitor node 101*m*. As the ch-by-ch control target values 52, different values may be defined on a wavelength-by-wavelength basis or the same value may be defined for all the wavelengths.

The ch-by-ch variable optical attenuator control amount 54 calculated by the comparison arithmetic device 53 is transmitted to the supervisory control signal transmitter-receiver 9. Then, after being multiplexed with the other control signal, the ch-by-ch variable optical attenuator control amount 54 is transmitted to the supervisory control signal transmitter-receiver 9 of the control node 101*c* via the supervisory control signal transmission line 10.

In the control node 101*c*, the ch-by-ch variable optical attenuator control amount 54 is extracted from the control signal transmitted from the supervisory control signal transmitter-receiver 9 of the monitor node 101*m*. The ch-by-ch variable optical attenuator control amount 54 that has been extracted is transmitted to the ch-by-ch variable optical attenuator control circuit 12.

The ch-by-ch variable optical attenuator control circuit 12 controls an attenuation amount of the ch-by-ch variable optical attenuators 2 in accordance with the received ch-by-ch variable optical attenuator control amount 54, and changes the target values of the power levels retained by the ch-by-ch variable optical attenuator 2. With this configuration, the pre-emphasis control is performed according to this embodiment.

Figure 4A:
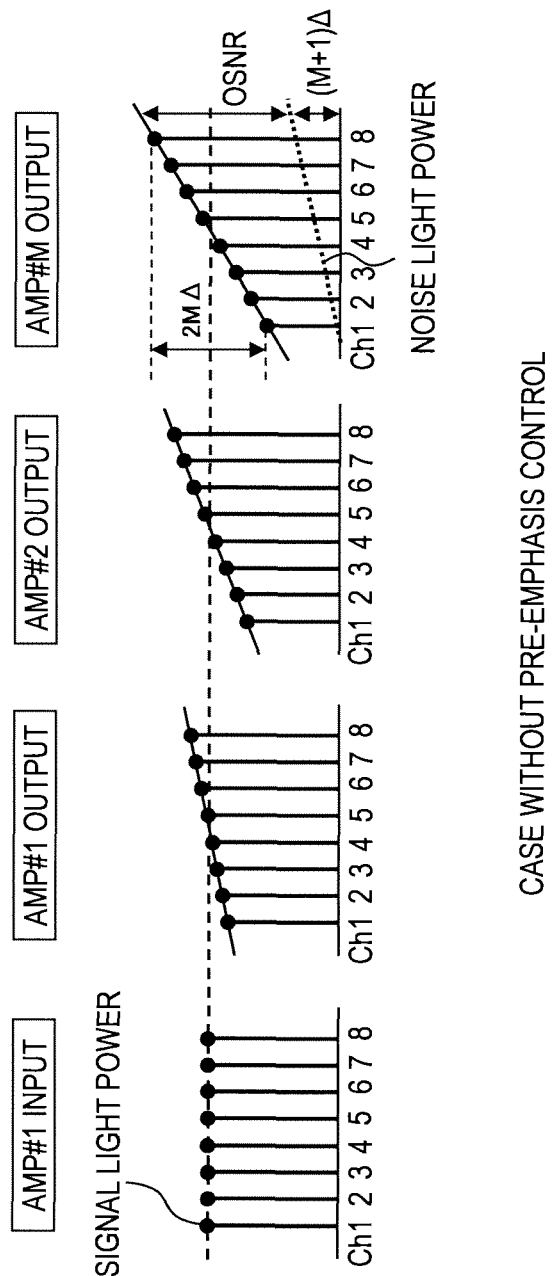
FIG. 4A is an explanatory diagram illustrating input/output spectra at respective optical amplifiers in a case where the pre-emphasis control is not performed according to the first embodiment of this invention.
Figure 4C:
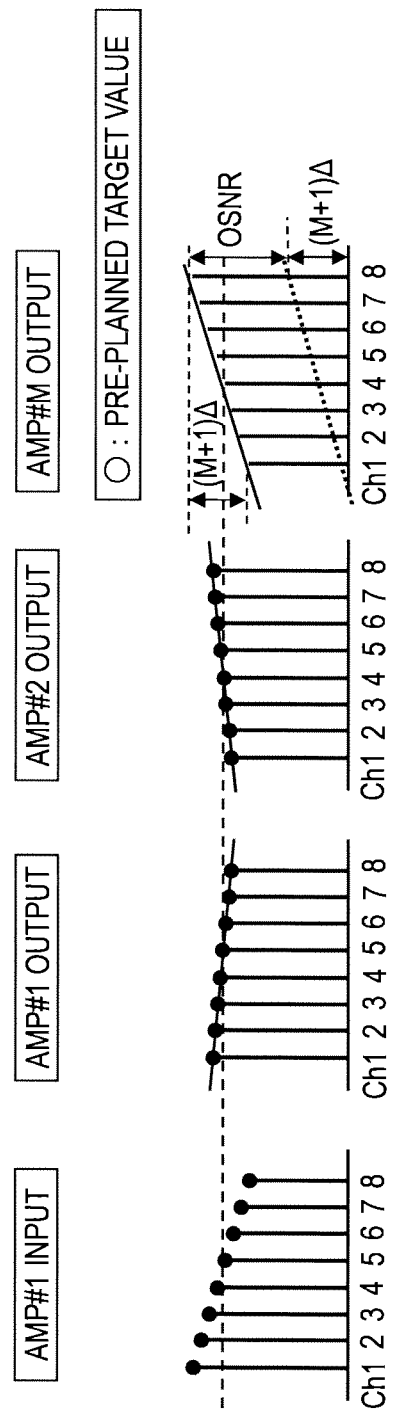
FIG. 4C is an explanatory diagram illustrating the input/output spectra at the respective optical amplifiers in a case where the pre-emphasis control is performed so that an OSNR becomes uniform at the monitor node according to the first embodiment of this invention.

FIG. 4A to FIG. 4C are explanatory diagrams illustrating input/output spectra at the respective optical amplifiers 4 in a case where the pre-emphasis control based on power monitoring is used and a case where the pre-emphasis control based on the power monitoring is not used. Channel numbers are indicated in the horizontal axis of FIG. 4A to FIG. 4C as ch1, ch2, . . . , ch8 in order from a short wavelength side. The channel number ch1 indicates the shortest wavelength, and the channel number ch8 indicates the longest wavelength.

FIG. 4A is an explanatory diagram illustrating the input/output spectra at the respective optical amplifiers 4 in a case where the pre-emphasis control is not performed according to the first embodiment of this invention.

FIG. 4A illustrates the input/output spectra at the respective optical amplifiers 4 in a case where the pre-emphasis control is not performed in the wavelength-division-multiplexing transport system illustrated in FIG. 3 and the attenuation amount of the ch-by-ch variable optical attenuators 2 is controlled so that the power levels of the respective optical signals become uniform at an input point of the optical amplifier 4#1. Here, the gain of the optical amplifier 4 is assumed to have wavelength dependence. In other words, FIG. 4A to FIG. 4C illustrate a case where the optical amplifier 4 has such a gain deviation that the gain becomes smaller at a shorter wavelength and larger at a longer wavelength.

As illustrated in FIG. 4A, due to the gain deviation between wavelengths exhibited by the optical amplifier 4, at an output point of the optical amplifier 4#1, the power levels of the optical signal at the longer wavelengths become higher than the power levels of the optical signals at the input point, and the power levels of the optical signal at the shorter wavelength become lower than the power levels of the optical signals at the input point. In other words, a processing performed by the optical amplifier 4 causes the inter-channel deviation in the power levels of the optical signal.

The inter-channel deviation accumulates and increases as the number of coupled optical amplifiers 4 through which the wavelength-division-multiplexed signal passes. The inter-channel deviation at an output point of the optical amplifier 4#2 illustrated in FIG. 4A is larger than the inter-channel deviation at the output point of the optical amplifier 4#1, and the inter-channel deviation at an output point of the optical amplifier 4#M is also larger than the inter-channel deviation at the output point of the optical amplifier 4#2.

In addition, the inter-channel deviation occurs in the signal light power, and at the same time, the inter-channel deviation occurs in the noise light power.

FIG. 4B is an explanatory diagram illustrating the input/output spectra at the respective optical amplifiers 4 in a case where the pre-emphasis control is performed so that the signal light power becomes uniform at the monitor node 101*m* according to the first embodiment of this invention.

In FIG. 4B, the attenuation amount of the ch-by-ch variable optical attenuators 2 is controlled so as to cancel the inter-channel deviation at the output point of the optical amplifier 4#M in the case where the pre-emphasis control is not performed. Therefore, at the optical amplifier 4#1, the power levels of the optical signal at the shorter wavelengths are higher, and the power levels of the optical signal at the longer wavelengths are lower.

Then, an inter-channel deviation amount of the signal light power is reduced every time the wavelength-division-multiplexed signal passes through the optical amplifier 4, and becomes zero as expected at the optical amplifier 4#M. Then, the power levels of the signal light power exhibit a flat characteristic at the optical amplifier 4#M.

However, even if the power levels are changed by the ch-by-ch variable optical attenuators 2, there is no change in the inter-channel deviation $((M+1)\cdot\Delta$ decibels) of the noise light power. Accordingly, an OSNR deviation occurs even in the case where the pre-emphasis control is carried out so that the signal light power becomes uniform.

Here, the OSNR at the shortest wavelength is minimal at the optical amplifier 4#M illustrated in FIG. 4A, and the OSNR at the longest wavelength is minimal at the optical amplifier 4#M illustrated in FIG. 4B. Accordingly, pre-emphasis conditions on which uniform OSNRs can be obtained exist at a midpoint between conditions of FIG. 4A and conditions of FIG. 4B.

FIG. 4C is an explanatory diagram illustrating the input/output spectra at the respective optical amplifiers 4 in a case where the pre-emphasis control is performed so that the OSNRs become uniform at the monitor node 101*m* according to the first embodiment of this invention.

In the case of FIG. 4C, the inter-channel deviation amount of the signal light power is equal to the inter-channel deviation amount of the noise light power, and hence the inter-channel deviation amount of the OSNR becomes zero.

The pre-emphasis control illustrated in FIG. 4C can be realized also by a conventional pre-emphasis technology as described above. In other words, the pre-emphasis control can be realized by monitoring OSNR values at the monitor node 101m and feedback-controlling an optical level adjustment function (in other words, ch-by-ch variable optical attenuator 2) located upstream (in other words, control node 101c) so that the OSNRs of the respective channels become uniform.

However, as described below, the OSNRs uniform among the channels can be acquired also by employing automatic level control (ALC) for measuring only the power levels of the optical signal without monitoring the OSNRs and for feedback-controlling the optical level adjustment function located upstream in accordance with the measured power level.

Hereinafter, description is made of a method of calculating the deviation amount of the OSNR based on the power levels of the optical signal.

In this embodiment, in order to quantitatively estimate the power levels of signal light and noise light, the following simplified model is employed. Specifically, in this embodiment, the inter-channel deviation amount is equal between the respective optical amplifiers 4, and gain deviation amounts with respect to a given reference wavelength at the longest wavelength and the shortest wavelength per optical amplifier 4 are ±Δ (decibels).

Further, the inter-channel deviation amount is represented by δ in a linear region. The variables δ and Δ have a relationship satisfying 10 Log 10(δ)=Δ, where Log 10( ) represents a logarithm with base 10. The gain at the reference wavelength is represented by G in the linear region. By using the gain G at the reference wavelength and the inter-channel deviation amount δ in the linear region, the gain at the longest wavelength is expressed by G·δ, and the gain at the shortest wavelength is expressed by G/δ.

Further, the noise light generated in the respective optical amplifiers 4 is proportional to the gain of the wavelength. In other words, an optical noise generation amount at the longest wavelength is expressed by G·N·δ, and the optical noise generation amount at the shortest wavelength is expressed by G·N/δ. Here, N is a coefficient indicating the optical noise generation amount per gain.

A span loss L is constant irrespective of the wavelength, and the gain G at the reference wavelength is defined as G·L=1 so as to cancel the span loss L.

Based on the above-mentioned calculation model, in a case where the optical signal whose power levels at the respective wavelengths are equal at the input point of the optical amplifier 4#1 is input to the optical amplifier 4#1, the power levels (linear region) including the signal light power and the noise light power at the output point of the optical amplifier 4#1 are obtained by the following expressions. It should be noted that the power levels of the optical signal at the input point of the optical amplifier 4#1 are represented by P.

In both the expressions, the first term on the right-hand side represents the signal light, the second term on the right-hand side represents the noise light, and the ratio of the first term on the right-hand side to the second term on the right-hand side represents the OSNR.

(output at the shortest wavelength)=$G \cdot P/\delta + G \cdot N/\delta$ (1)

(output at the longest wavelength)=$G \cdot P \cdot \delta + G \cdot N \cdot \delta$ (2)

Further, the output of the optical amplifier 4#2 is expressed by the following expressions with G·L=1 used for simplification.

(output at the shortest wavelength)=$G \cdot P/\delta^2 + G \cdot N \cdot (\delta^{-2} + \delta^{-1})$ (3)

(output at the longest wavelength)=$G \cdot P \cdot \delta^2 + G \cdot N \cdot (\delta^2 + \delta)$ (4)

Here, "$\delta^2$" represents "the second power of δ", "$\delta^{-2}$" represents "the negative second power of δ", and "$\delta^{-1}$" represents "the negative first power of δ".

Further, the output of the optical amplifier 4#M is expressed by the following expressions.

(output at the shortest wavelength)=$(G \cdot P/\delta^M) + G \cdot N \cdot (\delta^{-M} + \delta^{-(M-1)} + \ldots + \delta^{-1})$ (5)

(output at the longest wavelength)=$(G \cdot P \cdot \delta^M) + G \cdot N \cdot (\delta^M + \delta^{(M-1)} + \ldots + \delta^1)$ (6)

Here, "$\delta^M$" represents "the Mth power of δ", "$\delta^{-M}$" represents "the negative Mth power of δ", "$\delta^{(M-1)}$" represents "the (M−1)th power of δ", "$\delta^{-(M-1)}$" represents "the negative (M−1)th power of δ", and "$\delta^{-1}$" represents "the negative first power of δ".

The inter-channel deviation amount of the signal light power is acquired by calculating the ratio of the signal light power (the first term on the right-hand side) between the longest wavelength and the shortest wavelength according to the above-mentioned relationships. Further, the inter-channel deviation amount of the noise light power is acquired by calculating the ratio of the noise light power (the second term on the right-hand side) between the longest wavelength and the shortest wavelength. In addition, the inter-channel deviation amount of the OSNR is acquired by calculating the ratio of the OSNRs (ratio between the first term on the right-hand side and the second term on the right-hand side) between the longest wavelength and the shortest wavelength. Those relationships are illustrated in FIG. 5.

FIG. 5 is an explanatory diagram illustrating the inter-channel deviation amounts of the signal light power, the noise light power, and the OSNR according to the first embodiment of this invention.

As illustrated in FIG. 5, the respective inter-channel deviation amounts exhibited in the output of the optical amplifier 4#M are as follows.

(inter-channel deviation amount of signal light power)=$2 \cdot M \cdot \Delta$ (decibels) (7)

(inter-channel deviation amount of noise light power)=$(M+1) \cdot \Delta$ (decibels) (8)

(inter-channel deviation amount of OSNR)=$(M-1) \cdot \Delta$ (decibels) (9)

According to those expressions, in a case where the inter-channel deviation amount of the gain of the optical amplifier 4 is ±Δ decibels, the inter-channel deviation amount of the signal light power (2·M·Δ) and the inter-channel deviation amount of the noise light power ((M+1)·Δ) occur in the optical signal at the output point of the optical amplifier 4#M. Further, the inter-channel deviation amount of the signal light power differs from the inter-channel deviation amount of the noise light power, and hence the inter-channel deviation amount ((M−1)·Δ decibels) occurs also in the OSNRs.

As described above, the OSNRs become uniform in a case where the inter-channel deviation amount of the signal light power and the inter-channel deviation amount of the noise light power have the same value ((M+1)·Δ decibels).

In other words, as a target value (corresponding to the ch-by-ch variable optical attenuator control amount 54) of the signal light power at the output point of the optical amplifier 4#M, the monitor node 101m selects the target value whose inter-channel deviation amount is (M+1)·Δ decibels. With this configuration, after the pre-emphasis control, as illustrated in FIG. 4C, the inter-channel deviation amount of the signal light power at the output point of the optical amplifier 4#M comes to have the same value ((M+1)·Δ decibels) as the inter-channel deviation amount of the noise light power. As a result, it is possible to cause an OSNR deviation amount between channels, which is a difference between two values of the signal light power and the noise light power, to be zero.

Accordingly, the monitor node 101m according to this embodiment acquires the inter-channel gain deviation amount (±Δ) at the optical amplifier 4#M, the number (M) of coupled optical amplifiers 4, and characteristic parameters of the other transmission devices in advance, and calculates the power levels (target values) of the optical signal, which satisfy such a condition as to exhibit uniform OSNRs, by the same procedure as the calculation used in the above-mentioned model.

Then, the target values calculated in advance (hereinafter, referred to as "pre-planned target values") are stored in the ch-by-ch control target value 52 of the variable optical attenuator control amount arithmetic circuit 8 of the monitor node 101m of FIG. 3. Then, the comparison arithmetic device 53 calculates the ch-by-ch variable optical attenuator control amount 54 based on the ch-by-ch power monitor value 51 and the ch-by-ch control target value 52. In addition, by the control (pre-emphasis control) of the ch-by-ch variable optical attenuator 2 of the control node 101c performed by the calculated ch-by-ch variable optical attenuator control amount 54, it is possible to cause the OSNR deviation amount between channels to be zero.

The calculation model illustrated in FIG. 5 is obtained by assuming that an occurrence of the OSNR deviation between channels is caused only by the gain deviation amount (±Δ) at the optical amplifier 4 and the number M of coupled optical amplifiers 4. However, in a case where the OSNR deviation occurs by another cause, it is also possible to cause the OSNR deviation amount between channels to be zero.

Specifically, in a case where the occurrence of the OSNR deviation is caused by factors that determine the OSNR such as characteristic parameters of the optical node 101 (for example, an intensity of the optical signal output from the optical transmitter 103, an amplifier gain of the optical repeater node, optical losses in the optical multiplexer 104, the optical demultiplexer 106, and the like, and an intensity of the optical noise generated in the optical repeater node), a fiber loss (span loss) in the optical fiber 102 between the optical nodes 101, and the number of optical repeater nodes, it is possible to cause the OSNR deviation amount between channels to be zero by calculating the pre-planned target values in consideration of the above-mentioned values.

However, the pre-planned target values are values calculated in a case where the characteristic parameter of the optical node 101 or the optical fiber 102 satisfies a given specific condition. Therefore, for example, in a case where the characteristic parameter of the optical node 101 or the optical fiber 102 has changed from an assumed value, such as at least one of a case where there is a change over time and a case where there is a change in the fiber loss, there is a possibility that the OSNR deviation amount between channels may not become zero as such a change occurs. As a result, there occurs a problem of not being able to obtain an expected effect of suppressing the OSNR deviation between channels.

In order to solve such a problem of not being able to obtain the expected effect of suppressing the OSNR deviation between channels, the system that performs the pre-emphasis control according to this embodiment needs to periodically monitor the characteristic parameter of the optical node 101 or the optical fiber 102 and periodically update the pre-planned target values. In addition, the pre-planned target values need to be updated depending on the number of wavelengths of the wavelength-division-multiplexed signal and the wavelength layout.

Figure 6:
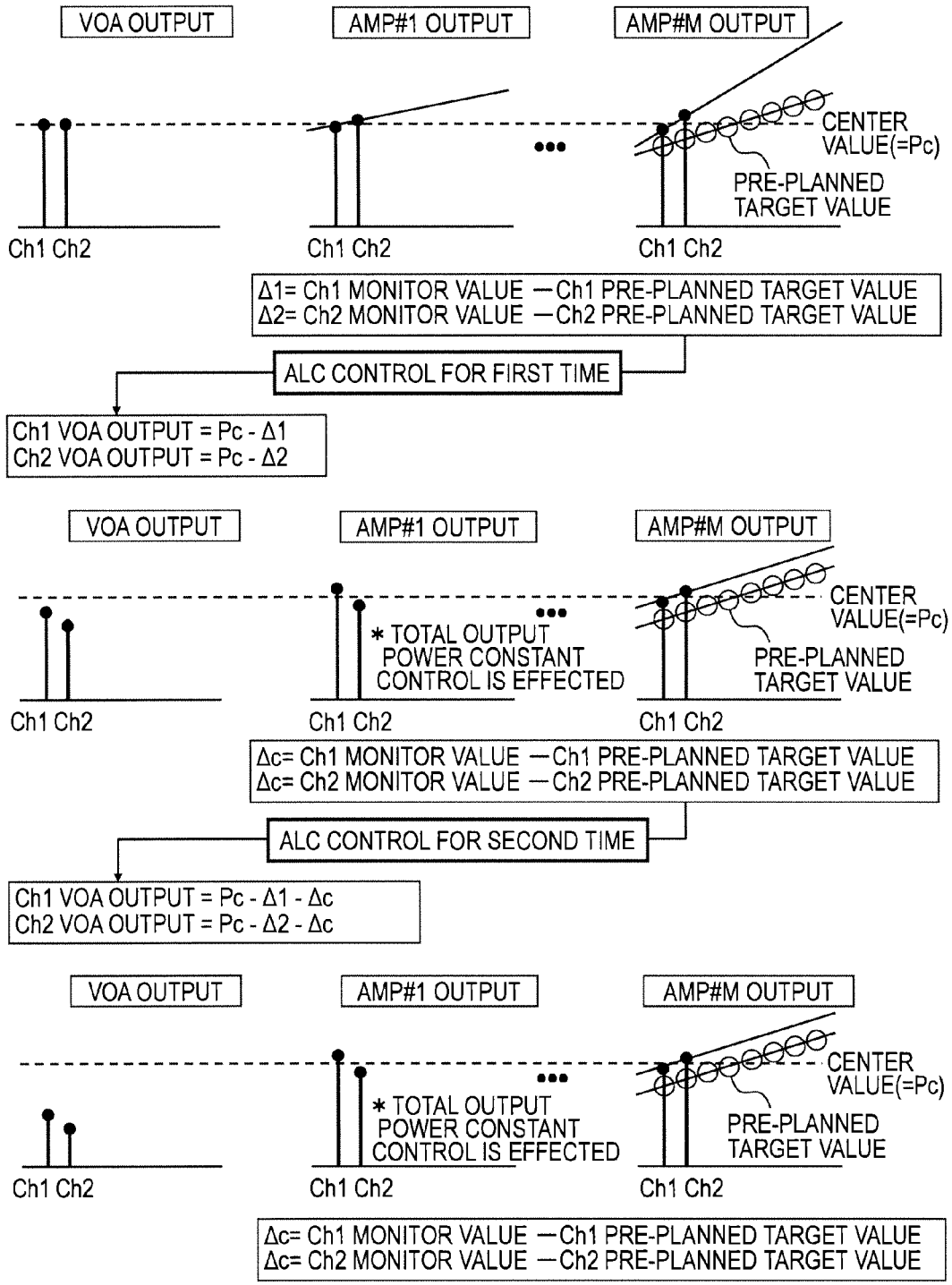
FIG. 6 is an explanatory diagram illustrating a problem in the pre-emphasis control based on the power level monitoring according to the first embodiment of this invention.

FIG. 6 is an explanatory diagram illustrating a problem in the pre-emphasis control based on the power level monitoring according to the first embodiment of this invention.

In FIG. 6, the pre-planned target values are previously calculated on a condition that the optical signals of all the channels of the wavelength-division-multiplexed signal exist. The pre-planned target value corresponding to channel 1 is set as a ch1 pre-planned target value, and the pre-planned target value corresponding to channel 2 is set as a ch2 pre-planned target value.

Further, in FIG. 6, the number of wavelengths of the wavelength-division-multiplexed signal is set to two (two channels), and both the two wavelengths unevenly exist on the short wavelength side.

First, the ch-by-ch variable optical attenuator control circuit 12 of the control node 101c controls the attenuation amount of the ch-by-ch variable optical attenuators 2 so that the signal light power with which the optical signals at channel 1 and channel 2 are output from the ch-by-ch variable optical attenuator 2 exhibits a center value Pc. Then, at the output point of the optical amplifier 4#M, the inter-channel deviation of the signal light power occurs between the optical signals at channel 1 and channel 2 due to the gain deviation at the optical amplifier 4#1 to the optical amplifier 4#M.

Here, a difference between the signal light power of channel 1 and the ch1 pre-planned target value and a difference between the signal light power of channel 2 and the ch2 pre-planned target value at the output point of the optical amplifier 4#M are referred to as Δ1 and Δ2, respectively. The monitor node 101m feeds back the differences Δ1 and Δ2 to the control node 101c, and the ch-by-ch variable optical attenuator control circuit 12 of the control node 101c controls the ch-by-ch variable optical attenuator 2 to execute the pre-emphasis control (ALC control) for the first time by using the differences Δ1 and Δ2.

Specifically, it is determined that the power levels of the signal light power at the output point of the optical amplifier 4#M are excessive and higher than the pre-planned target values by the differences Δ1 and Δ2 at channels 1 and 2, respectively, and hence the ch-by-ch variable optical attenuator control circuit 12 controls the ch-by-ch variable optical attenuators 2 so that the signal light power output from the ch-by-ch variable optical attenuators 2 exhibits values smaller than the center value Pc (indicated by the broken line in FIG. 6) by the differences Δ1 and Δ2 (pre-emphasis control).

Here, the general optical amplifier 4 has a function of controlling all output power (total output power) at a constant level (total output power constant control).

In this embodiment, assuming that (the target value of the total output power of the optical amplifier 4)=(the number of wavelengths)×(the center value Pc), the optical amplifier 4#1 controls the power level so as to maintain the total output power at a constant level. As a result, at the output point of the optical amplifier 4#1, the signal light power at channel 1 and channel 2 is recovered to about the center value Pc. In other words, the optical signals at channel 1 and channel 2 have the signal light power amplified by the optical amplifier 4#1 so that an average of the signal light power of the optical signals at channel 1 and channel 2 becomes the center value Pc.

Then, at the output point of the optical amplifier 4#M, the deviation amount of the signal light power between channel 1 and channel 2 and the deviation amount of the pre-planned target values between channel 1 and channel 2 are caused to be the same amount by the pre-emphasis control using the pre-planned target values. However, the signal light power at channel 1 and channel 2 comes to have values around the center value Pc by the total output power constant control performed by the optical amplifier 4#1 to the optical amplifier 4#M, the values therefore being larger than the pre-planned target value by a constant difference (=Δc). Here, Δc represents a difference between the center value Pc and the signal light power at channel 1 and channel 2.

Subsequently, the monitor node 101m feeds back the value Δc to the control node 101c, and the ch-by-ch variable optical attenuator control circuit 12 of the control node 101c uses the value Δc to control the ch-by-ch variable optical attenuator 2 to execute the pre-emphasis control for the second time.

As a result of the pre-emphasis control for the second time, at an output point of the ch-by-ch variable optical attenuator 2, the signal light power at channel 1 and channel 2 exhibits values smaller than the results of the pre-emphasis control for the first time by Δc. On the other hand, as a result of the operation of the total output power constant control performed by the optical amplifier 4#1, at the output point of the optical amplifier 4#1, the signal light power at channel 1 and channel 2 is again recovered to about the center value Pc. Then, at the output point of the optical amplifier 4#M, the values larger than the pre-planned target values by the constant difference Δc are obtained again.

After that, every time the pre-emphasis control is executed, the signal light power output from the ch-by-ch variable optical attenuator 2 is controlled to reduce by Δc. Therefore, in a case where the pre-emphasis control is repeatedly performed, the signal light power to be output continues to be controlled to reduce until the attenuation amount of the ch-by-ch variable optical attenuators 2 reaches a maximum value, with the result that the OSNR deteriorates to a considerable extent.

Therefore, the pre-planned target values calculated on the condition that the optical signals of all the channels of the wavelength-division-multiplexed signal exist are not suitable on a condition that the number of wavelengths and the wavelength layout are different, for example, on a condition that the optical signals unevenly exist at the short wavelengths as illustrated in FIG. 6. Therefore, in the pre-emphasis control using the pre-planned target values, the pre-planned target values need to be changed depending on the number of wavelengths of the wavelength-division-multiplexed signal or the wavelength layout.

In this embodiment, in order to solve the above-mentioned problem, there is provided pre-emphasis control that exhibits high stability and high reliability independently of the number of wavelengths or the wavelength layout or of fluctuations in the characteristic parameter of the optical node 101 or the optical fiber 102.

Figure 7:
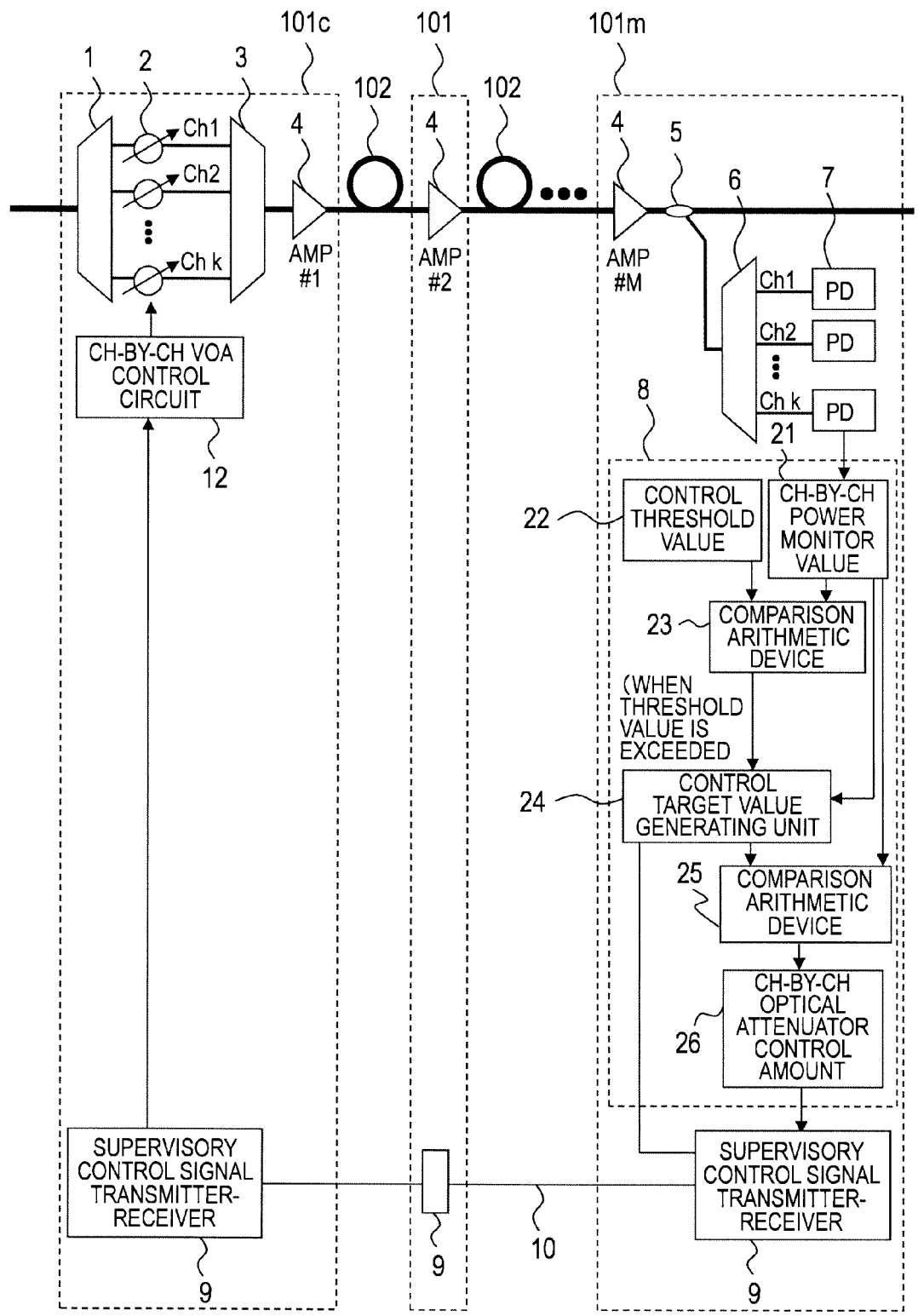
FIG. 7 is a diagram illustrating a configuration of the wavelength-division-multiplexing transport system that performs the pre-emphasis control based on the power level monitoring according to the first embodiment of this invention.

FIG. 7 is a diagram illustrating a configuration of the wavelength-division-multiplexing transport system that performs the pre-emphasis control based on the power level monitoring according to the first embodiment of this invention.

The control node 101c and the optical node 101 of FIG. 7 are the same as the control node 101c and the optical node 101 of FIG. 3. Further, the optical amplifier 4#M, the optical coupler 5, the optical demultiplexer 6, the photodiodes (PDs) 7, and the supervisory control signal transmitter-receiver 9 that are included in the monitor node 101m of FIG. 7 are the same as the optical amplifier 4#M, the optical coupler 5, the optical demultiplexer 6, the photodiodes (PDs) 7, and the supervisory control signal transmitter-receiver 9 included in the monitor node 101m of FIG. 3.

The variable optical attenuator control amount arithmetic circuit 8 of FIG. 7 includes a comparison arithmetic device 23, a control target value generating unit 24, and a comparison arithmetic device 25.

Ch-by-ch power monitor values 21 acquired by the PDs 7 are input to the variable optical attenuator control amount arithmetic circuit 8. In the variable optical attenuator control amount arithmetic circuit 8, the comparison arithmetic device 23 performs a comparison arithmetic operation between the respective ch-by-ch power monitor values 21 and respective control threshold values 22 defined in advance.

The control threshold value 22 is a value previously input to the monitor node 101m by the administrator or the like by using the input/output device or the like included in the monitor node 101m. The monitor node 101m retains the control threshold value 22 in the memory, the auxiliary storage unit, or the like.

As a result of the comparison, when it is determined that the ch-by-ch power monitor value 21 is larger than the control threshold value 22, the control target value generating unit 24 calculates a ch-by-ch control target value from the ch-by-ch power monitor value 21. The control target value generating unit 24 retains a function for calculating the ch-by-ch control target value by using the ch-by-ch power monitor value 21 as an argument.

The comparison arithmetic device 25 performs a comparison arithmetic operation between the ch-by-ch control target values calculated by the control target value generating unit 24 and the ch-by-ch power monitor values 21 acquired by the PDs 7 to calculate a ch-by-ch variable optical attenuator control amount 26. The calculated ch-by-ch variable optical attenuator control amount 26 is transmitted to the supervisory control signal transmitter-receiver 9, and after being multiplexed with the other control signal, transmitted to the supervisory control signal transmitter-receiver 9 of the control node 101c via the supervisory control signal transmission line 10.

The supervisory control signal transmitter-receiver 9 of the control node 101c extracts the ch-by-ch variable optical attenuator control amount 26 from the received signal, and transmits the extracted ch-by-ch variable optical attenuator control amount 26 to the ch-by-ch variable optical attenuator control circuit 12. The ch-by-ch variable optical attenuator control circuit 12 controls the attenuation amount of the ch-by-ch variable optical attenuators 2 according to the received ch-by-ch variable optical attenuator control amount 26. With this configuration, the ch-by-ch variable optical attenuator control circuit 12 performs the pre-emphasis control on the power levels of the outputs from the ch-by-ch variable optical attenuators 2.

The following description is made of a procedure for calculating, by the control target value generating unit 24, the ch-by-ch control target value based on the ch-by-ch power monitor value 21 when the comparison arithmetic device 23 determines that the ch-by-ch power monitor value 21 is larger than an upper limit (upper side) of the control threshold value 22 or smaller than a lower limit (lower side) of the control threshold value 22.

Figure 8:
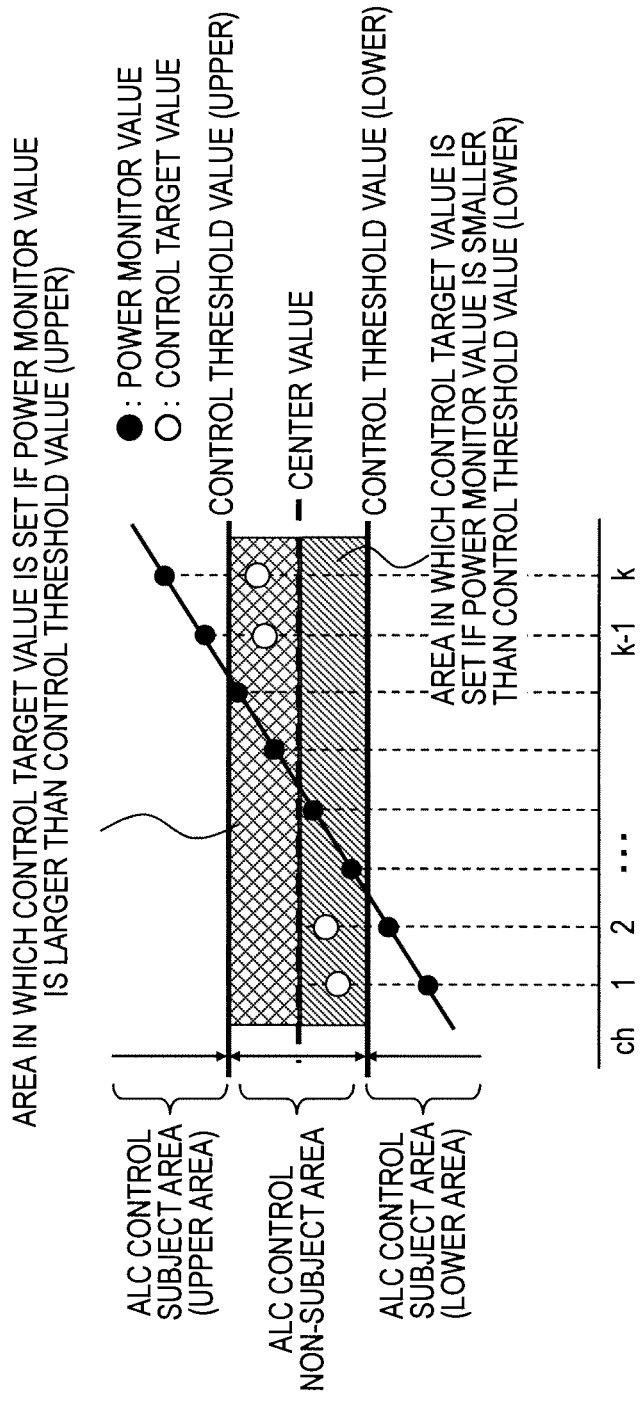
FIG. 8 is an explanatory diagram illustrating ch-by-ch power monitor values and ch-by-ch control target values according to the first embodiment of this invention.

FIG. 8 is an explanatory diagram illustrating the ch-by-ch power monitor values 21 and the ch-by-ch control target values according to the first embodiment of this invention.

FIG. 8 illustrates the ch-by-ch power monitor values 21 (indicated by the black circles in FIG. 8) at the monitor node 101m, the control threshold values (including threshold values on the upper side and the lower side) 22, and the ch-by-ch control target values (indicated by the white circles in FIG. 8). Further, FIG. 8 illustrates the center value Pc between the control threshold value (upper side) and the control threshold value (lower side). Here, the center value Pc is an arbitrary value described below.

In FIG. 8, the ch-by-ch power monitor values 21 for the two channels ch(k−1) and ch(k) exceed the control threshold value (upper side). Therefore, the optical signals at ch(k−1) and ch(k) are subjected to the pre-emphasis control according to this embodiment, and the ch-by-ch control target values corresponding to the optical signals at ch(k−1) and ch(k) are calculated by the control target value generating unit 24. The ch-by-ch control target values to be calculated are defined to be values between the control threshold value (upper side) and the center value Pc.

Further, in FIG. 8, the ch-by-ch power monitor values 21 for the two channels ch1 and ch2 fall below the control threshold value (lower side). Therefore, the optical signals at ch1 and ch2 are subjected to the pre-emphasis control according to this embodiment, and the ch-by-ch control target values corresponding to the optical signals at ch1 and ch2 are calculated by the control target value generating unit 24. The ch-by-ch control target values to be calculated are defined to be values between the control threshold value (lower side) and the center value Pc.

The ch-by-ch power monitor values 21 for ch3 to ch(k−2) are values between the control threshold value (lower side) and the control threshold value (upper side) within a range of the control threshold value (between the control threshold value on the lower side and the control threshold value on the upper side). Therefore, the optical signals at ch3 to ch(k−2) are not subjected to the pre-emphasis control according to this embodiment. Then, the ch-by-ch control target values corresponding to the optical signals at ch3 to ch(k−2) are not calculated.

As described above, the control target value generating unit 24 according to this embodiment calculates a new ch-by-ch control target value, which is included between the control threshold value (upper side) and the center value Pc, for the optical signal at the channel at which the ch-by-ch power monitor value 21 exceeds the control threshold value (upper side). Further, the control target value generating unit 24 calculates a new ch-by-ch control target value, which is included between the control threshold value (lower side) and the center value Pc, for the optical signal at the channel at which the ch-by-ch power monitor value 21 falls below the control threshold value (lower side).

On the other hand, as illustrated in FIG. 5, the inter-channel deviation amount of the noise light power at the optical amplifier 4#M is (M+1)·Δ. In the case where the inter-channel deviation amount of the signal light power is equal to the inter-channel deviation amount of the noise light power, the OSNR deviation amount between channels is zero. Therefore, the OSNRs can be caused to be uniform by setting the inter-channel deviation amount of the ch-by-ch control target value for the pre-emphasis control to (M+1)·Δ.

Further, the new ch-by-ch control target values illustrated in FIG. 8 are calculated independently on a channel-by-channel basis. In other words, each of the comparison between the ch-by-ch power monitor value 21 and the control threshold value and the calculation of the new ch-by-ch control target value is performed independently on a channel-by-channel basis without depending on control information on the other channel. Accordingly, it is possible to provide the pre-emphasis control that exhibits high versatility, high stability, and high reliability independently of the number of wavelengths and the wavelength layout.

Figure 9:
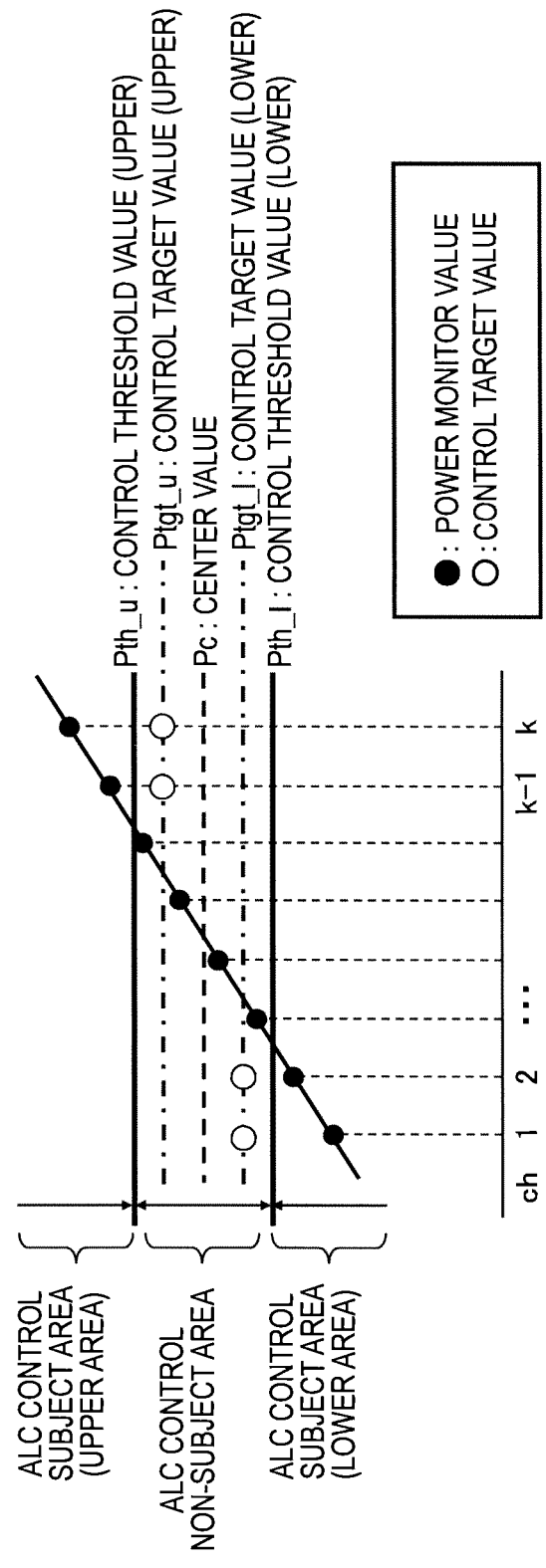
FIG. 9 is an explanatory diagram illustrating the ch-by-ch power monitor values and the ch-by-ch control target values being fixed values according to the first embodiment of this invention.

FIG. 9 is an explanatory diagram illustrating the ch-by-ch power monitor values 21 and the ch-by-ch control target values being fixed values according to the first embodiment of this invention.

Specific methods of calculating the ch-by-ch control target values according to the first embodiment include a method of setting the fixed value at the ch-by-ch control target value.

When the ch-by-ch power monitor value 21 (power monitor value Pmon) exceeds the control threshold value 22 on the upper side (Pth_u) (Pmon>Pth_u), a ch-by-ch control target value Ptgt_u is defined as a value (Pc<Ptgt_u<Pth_u) between the center value Pc and the control threshold value (upper side) Pth_u. The ch-by-ch control target value Ptgt_u is the fixed value.

Further, when the power monitor value Pmon falls below the control threshold value (lower side) Pth_l (Pmon<Pth_l), a ch-by-ch control target value Ptgt_l is defined as a value (Pc>Ptgt_l<Pth_l) between the center value Pc and the control threshold value (lower side) Pth_l. The ch-by-ch control target value Ptgt_l is the fixed value.

In other words, the fixed value indicated by the ch-by-ch control target value Ptgt_l is defined as the ch-by-ch control target values for ch1 and ch2, and the fixed value indicated by the ch-by-ch control target value Ptgt_u is defined as the ch-by-ch control target values for ch(k−1) and ch(k).

Therefore, the control target value generating unit 24 retains a function for calculating the ch-by-ch control target value Ptgt_u being the fixed value when the ch-by-ch power monitor value 21 exceeds the control threshold value 22 on the upper side and calculating the ch-by-ch control target value Ptgt_l being the fixed value when the ch-by-ch power monitor value 21 falls below the control threshold value 22 on the lower side.

The center value Pc according to this embodiment may be an expected value of the power level of the optical signal at an optical power monitor point (position for monitoring the optical signal) in a level diagram in terms of the design of a wavelength-division-multiplexing system according to this embodiment, an average value of all the ch-by-ch power monitor values 21 included in the wavelength-division-multiplexed signal, or a median value of the ch-by-ch power monitor value 21. The median value of the ch-by-ch power monitor value 21 may be a value obtained by adding a maximum value and a minimum value of the ch-by-ch power monitor value 21 and dividing the addition result by two.

Further, in a case where the optical power monitor point is located on an output side of the optical amplifier 4 included in the monitor node 101m, the center value Pc may be a value obtained by converting the target value (output target value) for output power control in an output level adjusting function of the optical amplifier 4 into the ch-by-ch power monitor value.

The center value Pc is calculated by the control target value generating unit 24. The control target value generating unit 24 may acquire the ch-by-ch power monitor values 21 from the PDs 7 to calculate the center value Pc. Further, the control target value generating unit 24 may acquire the output target value from the optical amplifier 4#(M−1) or the optical amplifier 4#M of the monitor node 101m to calculate the center value Pc.

In addition, the center value Pc may be calculated based on the span loss in the optical fiber 102 between the monitor node 101m and the optical node 101 (hereinafter, referred to as "optical node 101(M−1)") located upstream of the monitor node 101m.

Specifically, first, the supervisory control signal transmitter-receiver 9 included in the optical node 101(M−1) transmits the control signal to the supervisory control signal transmitter-receiver 9 of the monitor node 101m. The control signal transmitted from the supervisory control signal transmitter-receiver 9 included in the optical node 101(M−1) to the supervisory control signal transmitter-receiver 9 included in the monitor node 101m includes a power monitor value obtained when the control signal is transmitted from the optical node 101(M−1) and the output target value of the optical amplifier 4#(M−1) included in the optical node 101(M−1).

The control target value generating unit 24 acquires the power monitor value obtained when the control signal is transmitted from the optical node 101(M−1) and the output target value of the optical amplifier 4#(M−1) included in the optical node 101(M−1), which are included in the control signal transmitted from the supervisory control signal transmitter-receiver 9 included in the optical node 101(M−1). Further, the control target value generating unit 24 acquires the power monitor value obtained when the control signal transmitted from the supervisory control signal transmitter-receiver 9 included in the optical node 101(M−1) is received by the monitor node 101m.

Subsequently, the control target value generating unit 24 acquires the span loss by calculating a difference between the power monitor value obtained when the control signal is transmitted from the optical node 101(M−1) and the power monitor value obtained when the control signal is received by the monitor node 101m. In addition, the control target value generating unit 24 reduces the output target value of the optical amplifying unit provided to the third optical node included in the second control signal based on the acquired span loss. As an example, the control target value generating unit 24 transforms the output target value of the optical amplifier 4#(M−1) included in the control signal and the acquired span loss to logarithms. Then, the control target value generating unit 24 subtracts the acquired span loss transformed to the logarithm from the output target value of the optical amplifier 4#(M−1) included in the control signal and transformed to the logarithm, and defines the subtraction result as the center value Pc.

The control target value generating unit 24 may calculate the center value Pc by the above-mentioned method.

Figure 10A:
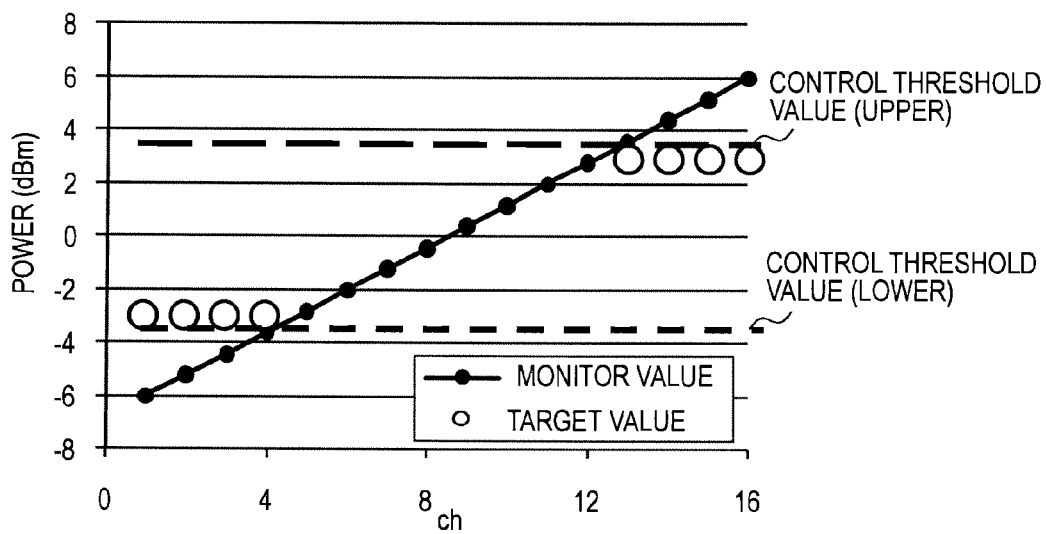
FIG. 10A is an explanatory diagram illustrating the ch-by-ch power monitor values and the ch-by-ch control target values at the monitor node before the pre-emphasis control according to the first embodiment of this invention.
Figure 10B:
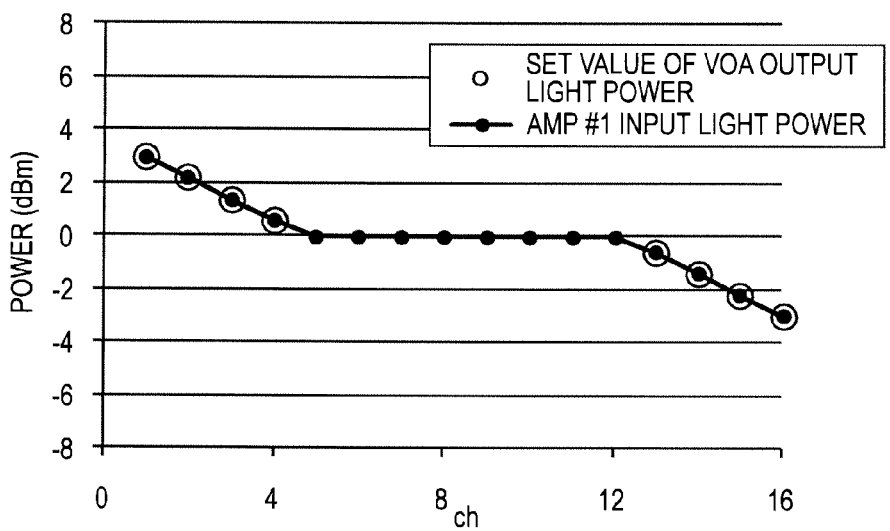
FIG. 10B is an explanatory diagram illustrating optical signal power at a control node after the pre-emphasis control according to the first embodiment of this invention.
Figure 10C:
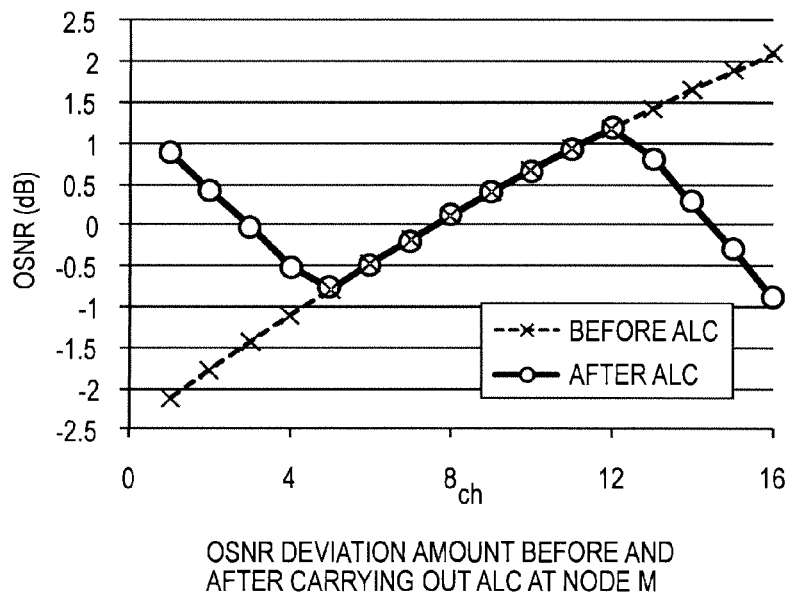
FIG. 10C is an explanatory diagram illustrating OSNR deviation amounts before and after the pre-emphasis control which are obtained at the monitor node according to the first embodiment of this invention.

FIG. 10A to FIG. 10C are explanatory diagrams illustrating specific examples of the ch-by-ch control target values in a case where the ch-by-ch control target values are set as the fixed values according to the first embodiment of this invention. In other words, FIG. 10A to FIG. 10C illustrate simulation results of the signal light power at the control node 101c and the monitor node 101m and the OSNRs, which are obtained in a case where the ch-by-ch control target values being the fixed values illustrated in FIG. 9 are defined by the variable optical attenuator control amount arithmetic circuit 8 illustrated in FIG. 7 and the pre-emphasis control according to the first embodiment is executed by using the defined ch-by-ch control target value.

The calculation conditions for the simulation results illustrated in FIG. 10A to FIG. 10C are that the number k of channels is sixteen, the channel numbers are ch1, ch2, . . . , ch16 in order from the short wavelength side, the number M of coupled optical amplifiers 4 is four, an average gain of the optical amplifiers 4 is 20 decibels, and a noise figure is 7 decibels. The noise figure does not depend on the wavelength. Further, it is assumed that the gain of the optical amplifier 4 has a linear inclination to the wavelength and that the gain deviation amount (Gtilt) with respect to the average gains at the longest wavelength and the shortest wavelength is ±1.5 decibels.

Further, an ALC control condition (pre-emphasis control condition) is that the control threshold value 22 (Pth) is (the center value Pc)±3.5 decibels.

FIG. 10A is an explanatory diagram illustrating the ch-by-ch power monitor values 21 and the ch-by-ch control target values at the monitor node 101m before the pre-emphasis control according to the first embodiment of this invention.

When the ch-by-ch power monitor value 21 exceeds the control threshold value 22 on the upper side, a ch-by-ch control target value (Ptarget) is defined as (the center value Pc)+3.0 decibels being the fixed value. Further, when the ch-by-ch power monitor value 21 falls below the control threshold value 22, the ch-by-ch control target value (Ptarget) is defined as (the center value Pc)−3.0 decibels being the fixed value.

In other words, when the ch-by-ch power monitor value 21 exceeds (the center value Pc)+3.5 decibels being the control threshold value 22 on the upper side, the control target value generating unit 24 calculates (the center value Pc)+3.0 decibels as the new ch-by-ch control target value. Further, when the ch-by-ch power monitor value 21 falls below (the center value Pc)−3.5 decibels being the control threshold value on the lower side, the control target value generating unit 24 calculates (the center value Pc)−3.0 decibels as the new ch-by-ch control target value.

Before the pre-emphasis control illustrated in FIG. 10A, the ch-by-ch variable optical attenuators 2 are controlled so that the signal light power of the respective channels at the input point of the optical amplifier 4#1 of the control node 101c becomes equal. The inter-channel deviation of the signal light power, which occurs due to the gain deviation exhibited by the optical amplifiers 4, is proportional to the number of coupled optical amplifiers 4 and accumulates. Therefore, the inter-channel deviation amount of the signal light power at the output point of the optical amplifier 4#M of the monitor node 101m is ±6 decibels (as indicated by the black circles in FIG. 10A).

Here, the ch-by-ch power monitor values 21 for ch1, ch2, ch3, and ch4 fall below the control threshold value 22 on the lower side (indicated by the broken line on the lower side in FIG. 10A). Therefore, the optical signals at ch1, ch2, ch3, and ch4 are subjected to the pre-emphasis control according to the first embodiment. The control target value generating unit 24 calculates (the center value Pc)−3.0 decibels as the new ch-by-ch control target values for the optical signals at ch1, ch2, ch3, and ch4 (as indicated by the white circles in FIG. 10A).

Further, the ch-by-ch power monitor values 21 for ch13, ch14, ch15, and ch16 exceed the control threshold value 22 on the upper side (indicated by the broken line on the upper side in FIG. 10A). Therefore, the optical signals at ch13, ch14, ch15, and ch16 are subjected to the pre-emphasis control according to the first embodiment. The control target value generating unit 24 calculates (the center value Pc)+3.0 decibels as the new ch-by-ch control target values for the optical signals at ch13, ch14, ch15, and ch16 (as indicated by the white circles in FIG. 10A).

As described above, on the calculation conditions of FIG. 10A, as a result of comparing the ch-by-ch power monitor values 21 (indicated by the black circles in FIG. 10A) with the control threshold values 22 (indicated by the broken lines in FIG. 10A), the variable optical attenuator control amount arithmetic circuit 8 calculates the ch-by-ch control target values (indicated by the white circles in FIG. 10A) being (the center value Pc)±3.0 decibels for ch1, ch2, ch3, and ch4 and ch13, ch14, ch15, and ch16.

FIG. 10B is an explanatory diagram illustrating optical signal power at the control node 101c after the pre-emphasis control according to the first embodiment of this invention.

The comparison arithmetic device 25 calculates the new ch-by-ch variable optical attenuator control amount 26 (indicated by the white circles in FIG. 10B) corresponding to ch1, ch2, ch3, and ch4 and ch13, ch14, ch15, and ch16 from the differences between the ch-by-ch control target values calculated by the control target value generating unit 24 and the ch-by-ch power monitor value 21. In FIG. 10B, in a case where the ch-by-ch variable optical attenuator control amount 26 is negative, the ch-by-ch variable optical attenuator control circuit 12 performs control so as to lower the power levels of the outputs from the ch-by-ch variable optical attenuators 2.

The ch-by-ch variable optical attenuator control amount 26 is transmitted to the ch-by-ch variable optical attenuator control circuit 12 via the supervisory control signal transmitter-receiver 9 and the supervisory control signal transmission line 10. The ch-by-ch variable optical attenuator control circuit 12 controls the attenuation amount of the ch-by-ch variable optical attenuators 2 by using the received ch-by-ch variable optical attenuator control amount 26. As a result, at the input point of the optical amplifier 4#1, the pre-emphasis control is executed on the optical signals at ch1, ch2, ch3, and ch4 and ch13, ch14, ch15, and ch16 as indicated by the black circles in FIG. 10B.

FIG. 10C is an explanatory diagram illustrating the OSNR deviation amounts before and after the pre-emphasis control at the monitor node 101m according to the first embodiment of this invention.

FIG. 10C illustrates the OSNR deviation amounts before and after the pre-emphasis control (ALC control) according to the first embodiment which are obtained at the output point of the optical amplifier 4#M included in the monitor node 101m. The OSNR deviation amount illustrated in FIG. 10C exhibits relative values of the OSNRs of the respective channels to an OSNR average of all the channels included in the wavelength-division-multiplexed signal.

The OSNR deviation amount before the pre-emphasis control (indicated by x marks in FIG. 10C) exhibits the maximum value of +2.1 decibels and the minimum value of −2.1 decibels. Therefore, the OSNR deviation amount between channels from the maximum value to the minimum value is 4.2 decibels.

On the other hand, the OSNR deviation amounts at ch1, ch2, ch3, and ch4 increase after the pre-emphasis control (indicated by the white circles in FIG. 10C). This is because the pre-emphasis control is performed to thereby increase the input to the optical amplifier 4#1 and increase the OSNRs at the output point of the optical amplifier 4#M.

In addition, the OSNR deviation amounts at ch13, ch14, ch15, and ch16 reduce after the pre-emphasis control. This is because the pre-emphasis control is performed to thereby reduce the input to the optical amplifier 4#1 and suppress the OSNRs at the output point of the optical amplifier 4#M.

As a result, the maximum value of the OSNR becomes +1.2 decibels, the minimum value becomes −0.9 decibels, and the OSNR deviation amount between channels from the maximum value to the minimum value becomes 2.1 decibels. Accordingly, the OSNR deviation amount after the pre-emphasis control reduces by 2.1 decibels.

As described above, according to the first embodiment, it is possible to provide the pre-emphasis control that suppresses the OSNR deviation between channels by monitoring the signal light power without using an expensive OSNR monitor.

Figure 11A:
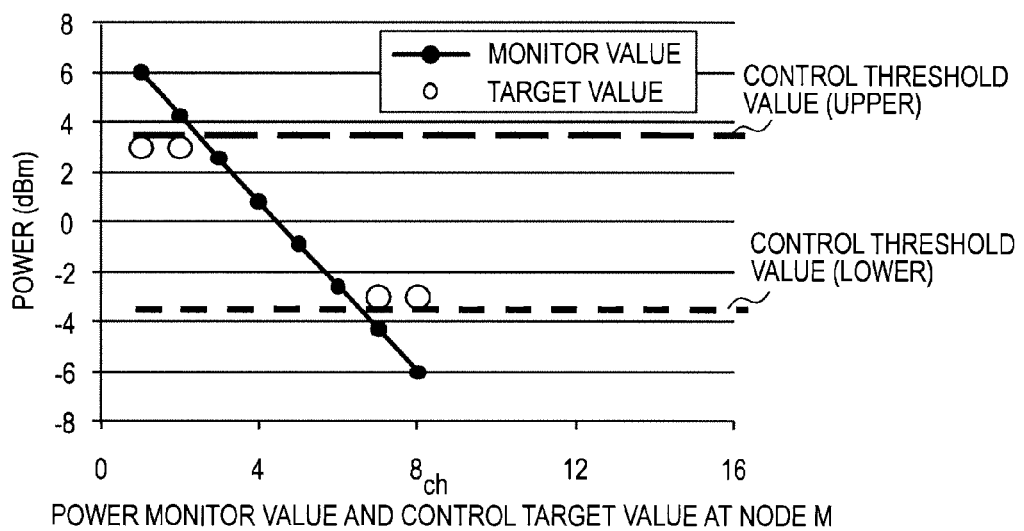
FIG. 11A is an explanatory diagram illustrating the ch-by-ch power monitor values and the ch-by-ch control target values at the monitor node before the pre-emphasis control according to the first embodiment of this invention.
Figure 11B:
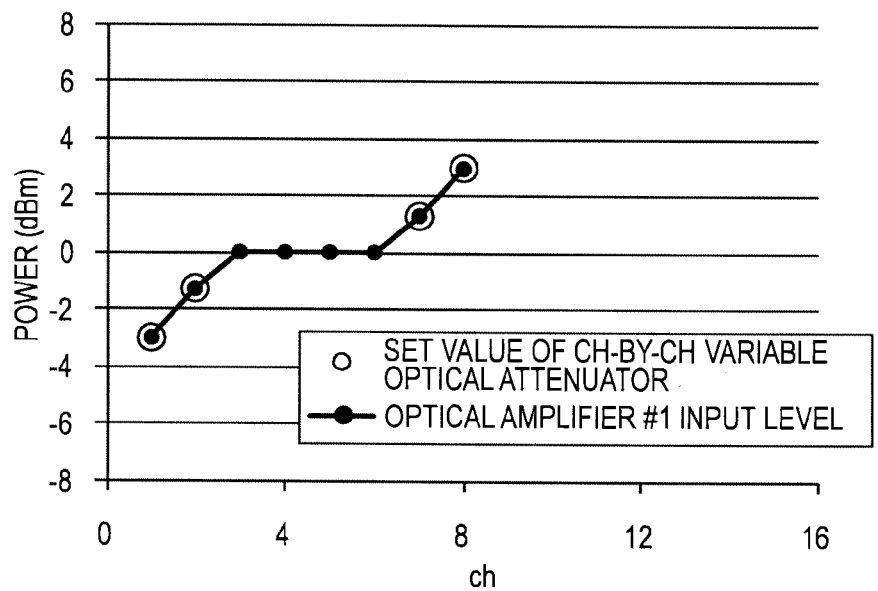
FIG. 11B is an explanatory diagram illustrating the optical signal power at the control node after the pre-emphasis control according to the first embodiment of this invention.
Figure 11C:
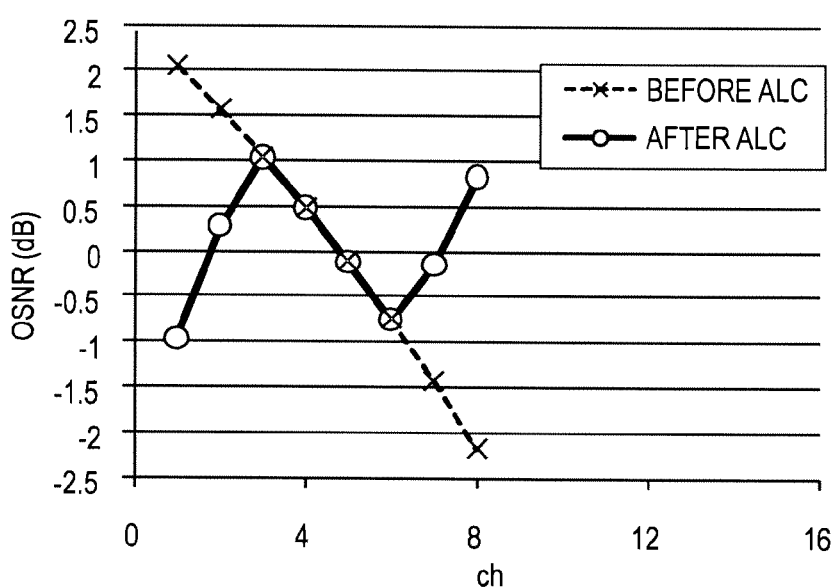
FIG. 11C is an explanatory diagram illustrating the OSNR deviation amounts before and after the pre-emphasis control at the monitor node according to the first embodiment of this invention.

FIG. 11A to FIG. 11C are explanatory diagrams illustrating how the pre-emphasis control according to the first embodiment realizes the pre-emphasis control that exhibits high stability and high reliability independently of the number of wavelengths or the wavelength layout or of changes in the characteristic parameter of the optical node 101 or the optical fiber 102.

FIG. 11A to FIG. 11C illustrate the simulation results of the signal light power at the control node 101c and the monitor node 101m and the OSNRs, which are obtained in the case where, in the same manner as in FIG. 10A, the pre-emphasis control using the fixed values as the ch-by-ch control target values is executed by the variable optical attenuator control amount arithmetic circuit 8 of FIG. 7. Further, FIG. 11A to FIG. 11C illustrate the simulation results obtained in the case where the optical signals included in the wavelength-division-multiplexed signal unevenly exist at the short wavelengths.

FIG. 11A is an explanatory diagram illustrating the ch-by-ch power monitor values 21 and the ch-by-ch control target values at the monitor node 101m before the pre-emphasis control according to the first embodiment of this invention.

The calculation conditions for the simulation results illustrated in FIG. 11A to FIG. 11C are that the number k of channels is eight, the channel numbers are ch1, ch2, . . . , and ch8 in order from the short wavelength side, the number M of coupled optical amplifier 4 is four, the average gain of the optical amplifiers 4 is 20 decibels, and the noise figure is 7 decibels. The noise figure does not depend on the wavelength. Further, it is assumed that the gain of the optical amplifier 4 has a linear inclination to the wavelength and that the gain deviation amount (Gtilt) with respect to the average gains at the longest wavelength and the shortest wavelength is ±1.5 decibels.

Further, the ALC control condition (pre-emphasis control condition) is that the control threshold value 22 (Pth) is (the center value Pc)±3.5 decibels. Further, the ch-by-ch control target value (Ptarget) defined in the case where the ch-by-ch power monitor value 21 exceeds the control threshold value 22 is (the center value Pc)+3.0 decibels, and the ch-by-ch control target value (Ptarget) defined in the case where the ch-by-ch power monitor value 21 falls below the control threshold value 22 is (the center value Pc)−3.0 decibels.

The calculation conditions of FIG. 11A to FIG. 11C are different from the calculation conditions of FIGS. 10A to 10C in that the number k of channels is eight and that the gain of the optical amplifier 4 is large on the short wavelength side.

Before the pre-emphasis control illustrated in FIG. 11A, the ch-by-ch variable optical attenuators 2 are controlled so that the signal light power of the respective channels at the input point of the optical amplifier 4#1 of the control node 101c becomes equal. The inter-channel deviation of the signal light power, which occurs due to the gain deviation exhibited by the optical amplifiers 4, is proportional to the number of coupled optical amplifiers 4 and accumulates. Therefore, the inter-channel deviation amount of the signal light power at the output point of the optical amplifier 4#M of the monitor node 101m is ±6 decibels before the pre-emphasis control (as indicated by the black circles in FIG. 11A).

Here, the ch-by-ch power monitor values 21 for ch1 and ch2 exceeds the control threshold value 22 on the upper side (indicated by the broken line on the upper side in FIG. 11A). Therefore, the optical signals at ch1 and ch2 are subjected to the pre-emphasis control, and the control target value generating unit 24 calculates (the center value Pc)+3.0 decibels as the new ch-by-ch control target values (as indicated by the white circles in FIG. 11A).

Further, the ch-by-ch power monitor values 21 for ch7 and ch8 fall below the control threshold value 22 on the lower side (indicated by the broken line on the lower side in FIG. 11A). Therefore, the optical signals at ch7 and ch8 are subjected to the pre-emphasis control, and the control target value generating unit 24 calculates (the center value Pc)−3.0 decibels as the new ch-by-ch control target values (as indicated by the white circles in FIG. 11A).

As described above, on the calculation conditions of FIG. 11A, as a result of comparing the ch-by-ch power monitor values 21 (indicated by the black circles in FIG. 11A) with the control threshold values 22 (indicated by the broken lines in FIG. 11A), the variable optical attenuator control amount arithmetic circuit 8 calculates the ch-by-ch control target values (indicated by the white circles in FIG. 11A) being (the center value Pc)±3.0 decibels corresponding to ch1 and ch2 and ch7 and ch8.

FIG. 11B is an explanatory diagram illustrating the optical signal power at the control node 101c after the pre-emphasis control according to the first embodiment of this invention.

The comparison arithmetic device 25 calculates the new ch-by-ch variable optical attenuator control amount 26 (indicated by the white circles in FIG. 11B) corresponding to ch1 and ch2 and ch7 and ch8 from the differences between the ch-by-ch control target values calculated by the control target value generating unit 24 and the ch-by-ch power monitor value 21. In FIG. 11B, in the case where the ch-by-ch variable optical attenuator control amount 26 is negative, the ch-by-ch variable optical attenuator control circuit 12 performs control so as to lower the power levels of the outputs from the ch-by-ch variable optical attenuators 2.

The ch-by-ch variable optical attenuator control amount 26 is transmitted to the ch-by-ch variable optical attenuator control circuit 12 via the supervisory control signal transmitter-receiver 9 and the supervisory control signal transmission line 10. The ch-by-ch variable optical attenuator control circuit 12 controls the attenuation amount of the ch-by-ch variable optical attenuators 2 by using the transmitted ch-by-ch variable optical attenuator control amount 26. As a result, at the input point of the optical amplifier 4#1, the pre-emphasis control is executed on the optical signals at ch1 and ch2 and ch7 and ch8 as indicated by the black circles in FIG. 11B.

FIG. 11C is an explanatory diagram illustrating the OSNR deviation amounts before and after the pre-emphasis control at the monitor node 101m according to the first embodiment of this invention.

FIG. 11C illustrates the OSNR deviation amounts before and after the ALC control according to the first embodiment (pre-emphasis control according to the first embodiment) which are obtained at the output point of the optical amplifier 4#M included in the monitor node 101m. The OSNR deviation amount illustrated in FIG. 11C exhibits relative values of the OSNRs of the respective channels to the OSNR average of all the channels included in the wavelength-division-multiplexed signal.

The OSNR deviation amount before the pre-emphasis control (indicated by x marks in FIG. 11C) exhibits the maximum value of +2.1 decibels and the minimum value of −2.1 decibels. Therefore, the OSNR deviation amount between channels from the maximum value to the minimum value is 4.2 decibels.

On the other hand, the OSNR deviation amounts at ch7 and ch8 increase after the pre-emphasis control (indicated by the white circles in FIG. 11C). This is because the pre-emphasis control is performed to thereby increase the input to the optical amplifier 4#1 and increase the OSNRs at the output point of the optical amplifier 4#M.

In addition, the OSNR deviation amounts at ch1 and ch2 reduce after the pre-emphasis control. This is because the pre-emphasis control is performed to thereby reduce the input to the optical amplifier 4#1 and suppress the OSNRs at the output point of the optical amplifier 4#M.

As a result, after the pre-emphasis control, the maximum value of the OSNR becomes +1.1 decibels, the minimum value of the OSNR becomes −0.9 decibels, and the OSNR deviation amount between channels from the maximum value to the minimum value becomes 2.0 decibels.

Accordingly, the OSNR deviation amount after the pre-emphasis control reduces by 2.2 decibels.

According to the first embodiment, control target values are calculated on a channel-by-channel basis, and hence it is possible to suppress the OSNR deviation irrespective of the number of wavelengths and the wavelength layout. In other words, it is possible to realize the pre-emphasis control that suppresses the OSNR deviation between channels and exhibits high stability and high reliability independently of the number of wavelengths and the wavelength layout.

FIG. 12A to FIG. 12E illustrate the simulation results of the OSNR which are obtained at the output point of the optical amplifier 4#M on the same conditions as the calculation conditions of FIG. 11A to FIG. 11C except that only the gain deviation amount of the optical amplifier 4 is changed.

Figure 12A:
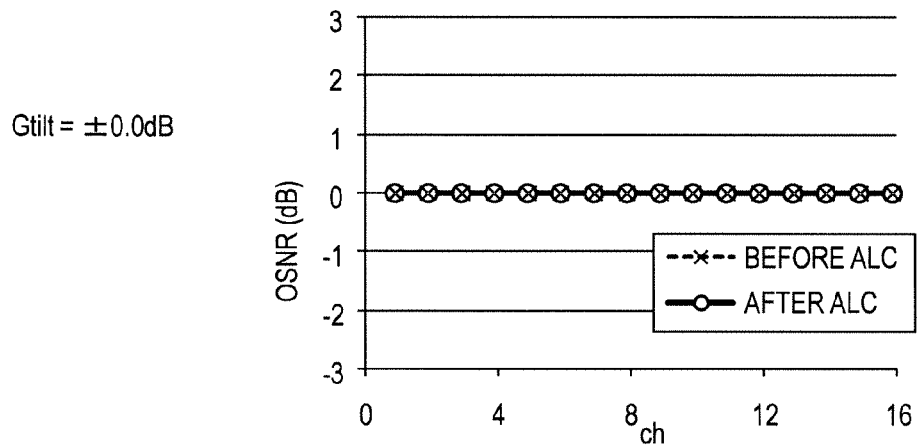
FIG. 12A is an explanatory diagram illustrating the OSNR deviation amounts at an optical amplifier in a case where a gain deviation amount at the optical amplifier is ±0.0 decibels according to the first embodiment of this invention.
Figure 12B:
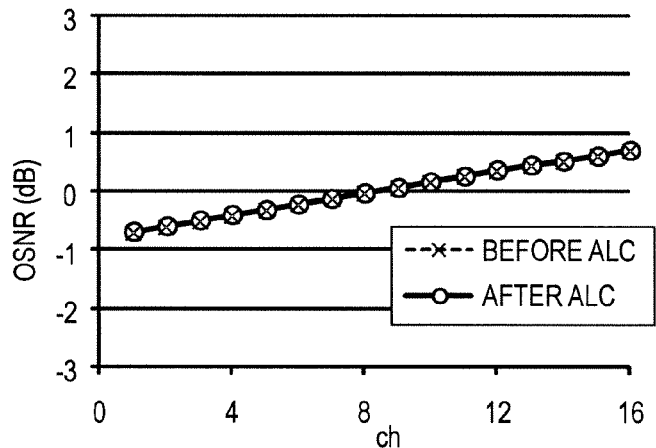
FIG. 12B is an explanatory diagram illustrating the OSNR deviation amounts at the optical amplifier in a case where the gain deviation amount at the optical amplifier is ±0.5 decibels according to the first embodiment of this invention.
Figure 12C:
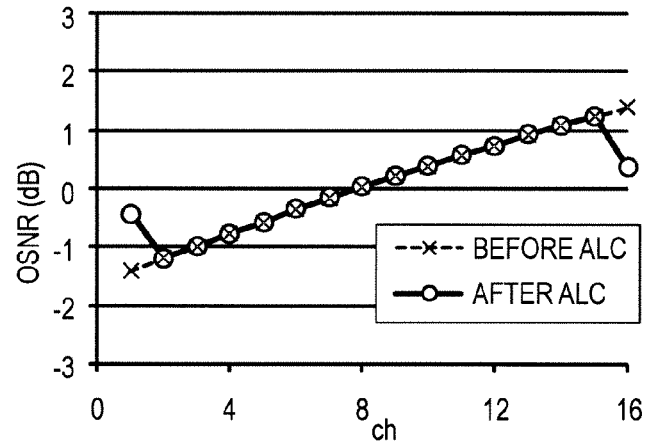
FIG. 12C is an explanatory diagram illustrating the OSNR deviation amounts at the optical amplifier in a case where the gain deviation amount at the optical amplifier is ±1.0 decibel according to the first embodiment of this invention.
Figure 12D:
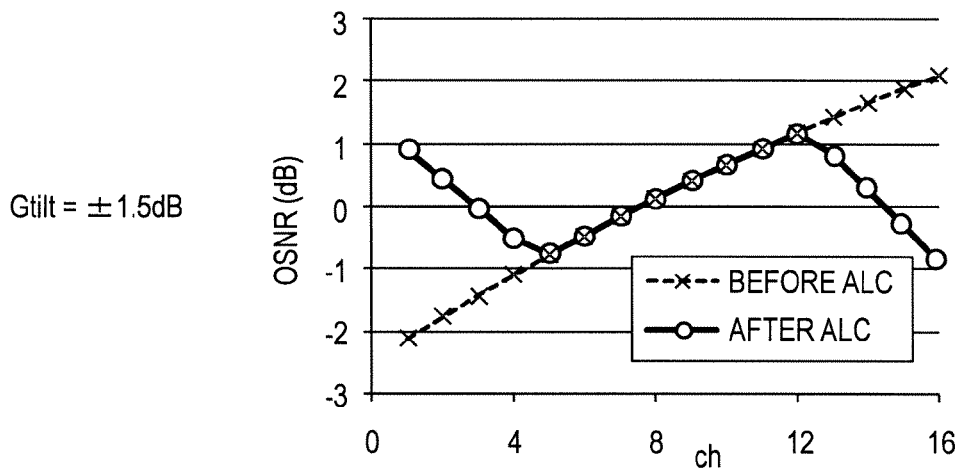
FIG. 12D is an explanatory diagram illustrating the OSNR deviation amounts at the optical amplifier in a case where the gain deviation amount at the optical amplifier is ±1.5 decibels according to the first embodiment of this invention.
Figure 12E:
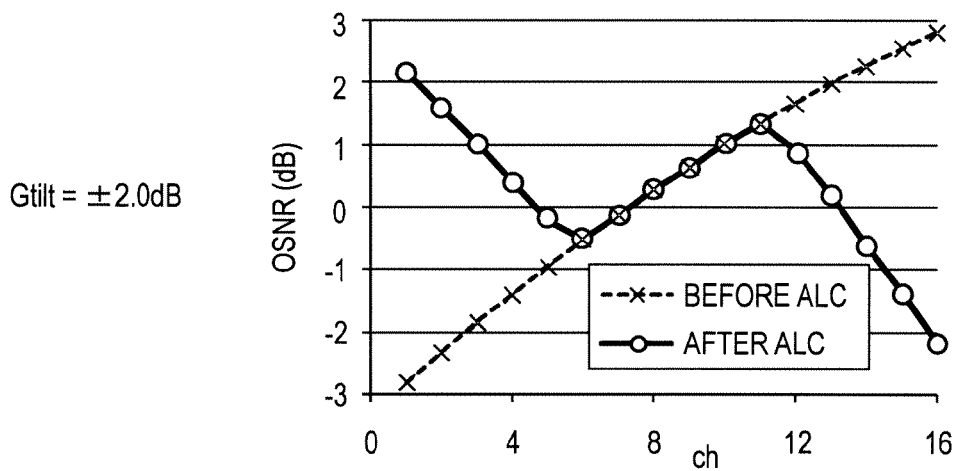
FIG. 12E is an explanatory diagram illustrating the OSNR deviation amounts at the optical amplifier in a case where the gain deviation amount at the optical amplifier is ±2.0 decibels according to the first embodiment of this invention.

In the respective figures, the gain deviation amount of the optical amplifier 4 is ±0.0 decibels in FIG. 12A, ±0.5 decibels in FIG. 12B, ±1.0 decibel in FIG. 12C, ±1.5 decibels in FIG. 12D, and ±2.0 decibels in FIG. 12E.

It should be noted that the channels illustrated in FIG. 12A to FIG. 12E are ch1 to ch16. In the wavelength-division-multiplexed signal, ch1 has the shortest wavelength, and ch16 has the longest wavelength.

FIG. 12A is an explanatory diagram illustrating the OSNR deviation amounts at the optical amplifier 4#M in a case where the gain deviation amount at the optical amplifier 4 is ±0.0 decibels according to the first embodiment of this invention.

On the conditions illustrated in FIG. 12A, the gain deviation amount of the optical amplifier 4 is 0, and hence the OSNRs of all the channels are uniform.

FIG. 12B is an explanatory diagram illustrating the OSNR deviation amounts at the optical amplifier 4#M in a case where the gain deviation amount at the optical amplifier 4 is ±0.5 decibels according to the first embodiment of this invention.

On the conditions illustrated in FIG. 12B, there exists no optical signal whose ch-by-ch power monitor value 21 before the pre-emphasis control exceeds the control threshold value 22. Therefore, the OSNR deviation amount between channels after the pre-emphasis control does not change from the OSNR deviation amount between channels before the pre-emphasis control.

FIG. 12C is an explanatory diagram illustrating the OSNR deviation amounts at the optical amplifier 4#M in a case where the gain deviation amount at the optical amplifier 4 is ±1.0 decibel according to the first embodiment of this invention.

On the conditions illustrated in FIG. 12C, the ch-by-ch power monitor values 21 for ch1 and ch16 before the pre-emphasis control fall outside the range of the control threshold value 22. Therefore, the pre-emphasis control is executed on the optical signals at ch1 and ch16. As a result, the OSNR deviation amount between channels after the pre-emphasis control becomes approximately ±1.25 decibels, thereby improving from the OSNR deviation amount between channels before the pre-emphasis control (approximately ±1.5 decibels).

FIG. 12D is an explanatory diagram illustrating the OSNR deviation amounts at the optical amplifier 4#M in a case where the gain deviation amount at the optical amplifier 4 is ±1.5 decibels according to the first embodiment of this invention.

On the conditions illustrated in FIG. 12D, the ch-by-ch power monitor values 21 for ch1, ch2, ch3, and ch4 and ch13, ch14, ch15, and ch16 before the pre-emphasis control fall outside the range of the control threshold value 22. Therefore, the pre-emphasis control is executed on the optical signals at ch1, ch2, ch3, and ch4 and ch13, ch14, ch15, and ch16. As a result, the OSNR deviation amount between channels after the pre-emphasis control becomes approximately ±1.0 decibel, thereby improving from the OSNR deviation amount between channels before the pre-emphasis control (approximately ±2.0 decibels).

FIG. 12E is an explanatory diagram illustrating the OSNR deviation amounts at the optical amplifier 4#M in a case where the gain deviation amount at the optical amplifier 4 is ±2.0 decibels according to the first embodiment of this invention.

On the conditions illustrated in FIG. 12E, the ch-by-ch power monitor values 21 for ch1, ch2, ch3, ch4 and ch5, and ch12, ch13, ch14, ch15, and ch16 before the pre-emphasis control fall outside the range of the control threshold value 22. Therefore, the pre-emphasis control is executed on the optical signals at ch1, ch2, ch3, and ch4 and ch5, and ch12, ch13, ch14, ch15, and ch16. As a result, the OSNR deviation amount between channels after the pre-emphasis control becomes approximately ±2.0 decibel, thereby improving from the OSNR deviation amount between channels before the pre-emphasis control (approximately ±3.0 decibels).

As illustrated in FIG. 12A to FIG. 12E, even in a case where there is a change in the gain deviation of the optical amplifier 4, the OSNR deviation amount is suppressed to a fixed range by the pre-emphasis control according to the first embodiment.

Even in a case where there is a change in the loss amount of the optical signal in the optical fiber 102, the gain deviation between channels may change depending on the change in the gain state within the optical amplifier 4. For example, in a case where the optical amplifier 4 is an erbium doped fiber amplifier, the input light power of the optical amplifier 4 changes as the loss amount in the optical fiber 102 changes.

As a result, a population inversion factor (ratio of the number of electrons between an upper laser level and a lower laser level) within erbium ions changes, and a gain profile with respect to the wavelength of the optical amplifier, in other words, the gain deviation changes. In addition, the general optical amplifier 4 has such a characteristic that the gain on a long wavelength side decreases as an input value with respect to the optical amplifier 4 decreases, while the gain on the short wavelength side decreases as the input value with respect to the optical amplifier 4 increases.

In other words, as illustrated in FIG. 12A to FIG. 12E, even in the case where there is a change in the gain deviation of the optical amplifier 4, the OSNR deviation amount is suppressed to the fixed range by the pre-emphasis control according to the first embodiment, and also in the case where there is a change in the loss amount of the optical fiber 102, the OSNR deviation amount is suppressed to the fixed range.

As described above, according to the first embodiment, the pre-emphasis control that exhibits high stability and high reliability independently of changes in the characteristic parameter of the optical node 101 or the optical fiber 102 is realized in the pre-emphasis control that suppresses the OSNR deviation between channels.

It should be noted that the control node 101c illustrated in FIG. 7 controls the power levels of the wavelength-division-multiplexed signal on a channel-by-channel basis by including the optical demultiplexer 1, the ch-by-ch variable optical attenuator 2, and the optical multiplexer 3, but the control node 101c according to this invention may control the power levels of the wavelength-division-multiplexed signal by employing any method or any device.

For example, the control node 101c may include an integrated function such as a wavelength selectable switch (WSS) or may include an element or a module that can control the power level on a ch-by-ch basis.

Further, the control node 101c illustrated in FIG. 7 has the ch-by-ch variable optical attenuator 2 located upstream of the optical amplifier 4#1, the control node 101c according to this invention may have the ch-by-ch variable optical attenuator 2 located downstream of the optical amplifier 4#1. Further, the control node 101c according to this invention does not necessarily include the optical amplifier 4#1.

Further, the monitor node 101m illustrated in FIG. 7 monitors the power levels of the wavelength-division-multiplexed signal on a channel-by-channel basis by including the optical demultiplexer 6 and the wavelength-by-wavelength photodiodes (PDs) 7, but the monitor node 101m according to this invention may monitor the power levels of the wavelength-division-multiplexed signal by any method or any device.

For example, the monitor node 101m according to this invention may monitor the power levels of the wavelength-division-multiplexed signal by including a tunable filter that causes a center wavelength to sweep with the lapse of time, one PD, and a signal processing circuit that converts time-series data on the PD into wavelength data (in synchronization with a sweep timing).

In addition, the monitor node 101m of FIG. 7 has the device that monitors the power levels of the wavelength-division-multiplexed signal on a ch-by-ch basis located downstream of the optical amplifier 4#M, but the monitor node 101m according to this invention may have a function that monitors the power levels of the wavelength-division-multiplexed signal on a ch-by-ch basis located upstream of the optical amplifier 4. Further, the monitor node 101m according to this invention does not necessarily include the optical amplifier 4#M.

Further, the supervisory control signal transmission line 10 of FIG. 7 represents a logical transmission line, and the same transmission line as the optical fiber 102 may be used as a physical transmission line. In this case, the supervisory control signal may be wavelength-division-multiplexed on the wavelength-division-multiplexed signal, and specifically, may be time-division-multiplexed, packet-division-multiplexed, or multiplexed on the overhead section. This invention is not limited in terms of a physical configuration for realizing the embodiment of this invention.

According to the first embodiment described above, the pre-emphasis control that suppresses the OSNR deviation between channels is realized by the pre-emphasis control that exhibits high stability and high reliability independently of the number of wavelengths of the wavelength-division-multiplexed signal or the wavelength layout and of fluctuations in the characteristic parameter of a transmission device or a transmission fiber without using an expensive OSNR monitor function.

Second Embodiment

FIG. 13A is an explanatory diagram illustrating a method of calculating ch-by-ch control target values according to a second embodiment of this invention.

FIG. 13A illustrates a conceptual diagram of a method of calculating the ch-by-ch control target values illustrated in FIG. 8 based on the ch-by-ch power monitor value 21 (power monitor value Pmon). When the power monitor value Pmon exceeds the control threshold value 22 (Pth_u) on the upper side (Pmon>Pth_u), the value (Pc<Ptgt_u<Pth_u) between the center value Pc and the control threshold value (upper side) Pth_u is calculated as the ch-by-ch control target value Ptgt_u.

Further, when the power monitor value Pmon falls below the control threshold value (lower side) Pth_l (Pmon<Pth_l), the value (Pc>Ptgt_l<Pth_l) between the center value Pc and the control threshold value (lower side) Pth_l is calculated as the ch-by-ch control target value Ptgt_l.

In FIG. 13A, control target values of the optical signals at ch1 and ch2 and ch(k) and ch(k−1) are calculated.

Figure 13B:
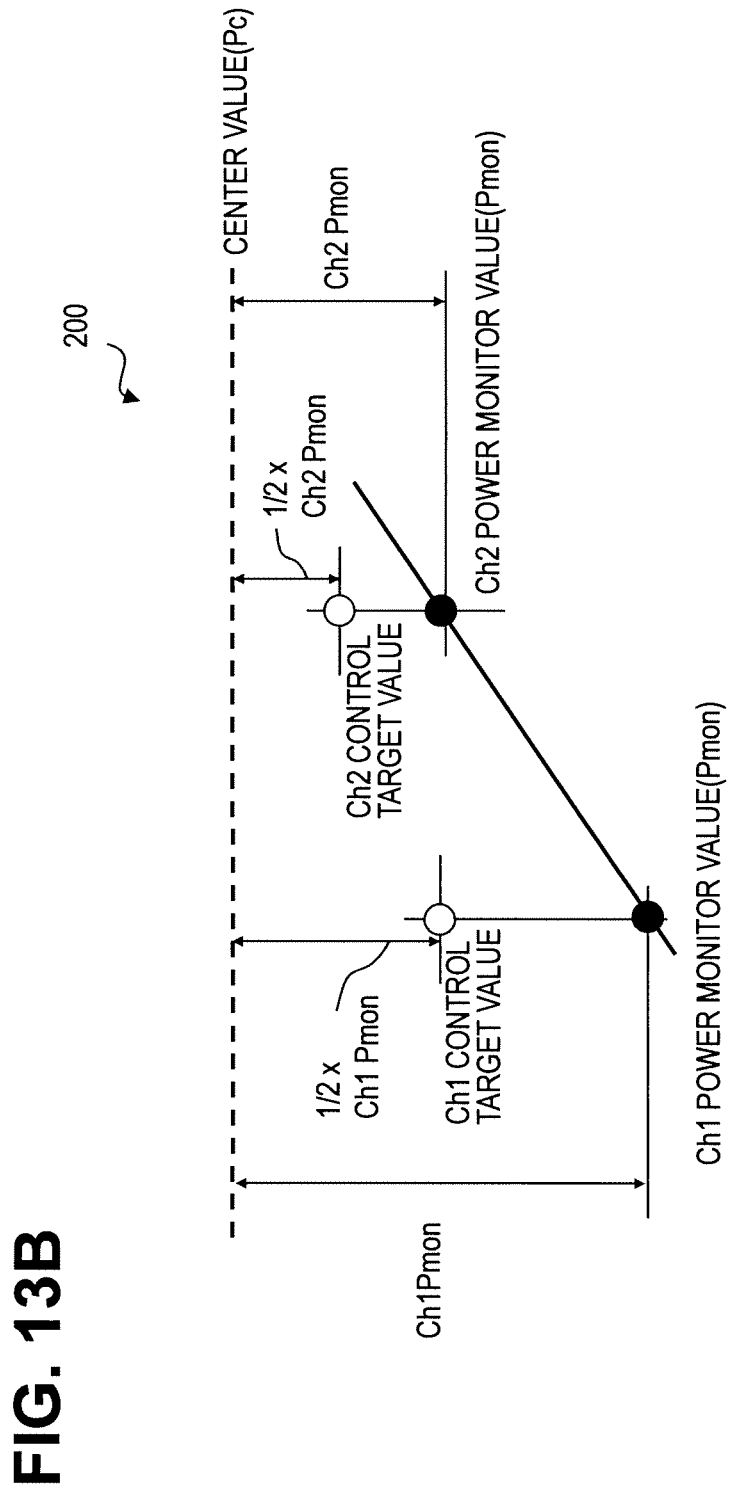
FIG. 13B is an explanatory diagram illustrating a method of calculating control target values based on ch-by-ch power monitor values according to the second embodiment of this invention.

FIG. 13B is an explanatory diagram illustrating a method of calculating the control target values based on the ch-by-ch power monitor values 21 according to the second embodiment of this invention.

The ch-by-ch control target value Ptgt according to the second embodiment (corresponding to the ch-by-ch variable optical attenuator control amount 26) is calculated by, for example, setting a value that is ½ of a relative value of the power monitor value Pmon to the center value Pc as a relative value of the ch-by-ch control target value to the center value Pc.

This calculation method is based on calculation results illustrated in FIG. 5. As illustrated in FIG. 5, the inter-channel deviation amount of the signal light power, in other words, the inter-channel deviation amount of a monitor value used for the control is 2·M·Δ at the output point of the optical amplifier 4#M. Further, similarly as illustrated in FIG. 5, the inter-channel deviation amount of the noise light power, in other words, the inter-channel deviation amount of the new ch-by-ch control target value of the signal light power for causing the OSNR deviation amount to become zero is expressed as (M+1)·Δ at the output point of the optical amplifier 4#M. In other words, the new ch-by-ch control target value is calculated by (value of the ch-by-ch power monitor value 21)×(M+1)/(2·M)≈(value of the ch-by-ch power monitor value 21)×1/2(M→∞)

Therefore, as illustrated in FIG. 13B, the new ch-by-ch control target value for ch1 is a result of dividing a sum of the ch-by-ch power monitor value 21 for channel 1 and the center value Pc by 2, and the new ch-by-ch control target value for ch2 is a result of dividing the sum of the ch-by-ch power monitor value 21 for channel 2 and the center value Pc by 2. Further, a new control target value for ch(k) is a result of dividing the sum of the ch-by-ch power monitor value 21 for channel k and the center value Pc by 2, and a new control target value for ch(k−1) is a result of dividing the sum of the ch-by-ch power monitor value 21 for channel (k−1) and the center value Pc by 2.

As described above, the control target value generating unit 24 according to the second embodiment retains a function for dividing the sum of the ch-by-ch power monitor value 21 and the center value Pc by 2. Then, the ch-by-ch variable optical attenuator control amount 26 corresponding to the optical signal whose ch-by-ch power monitor value 21 falls outside the range of the control threshold value 22 is calculated in accordance with the retained function.

Figure 14A:
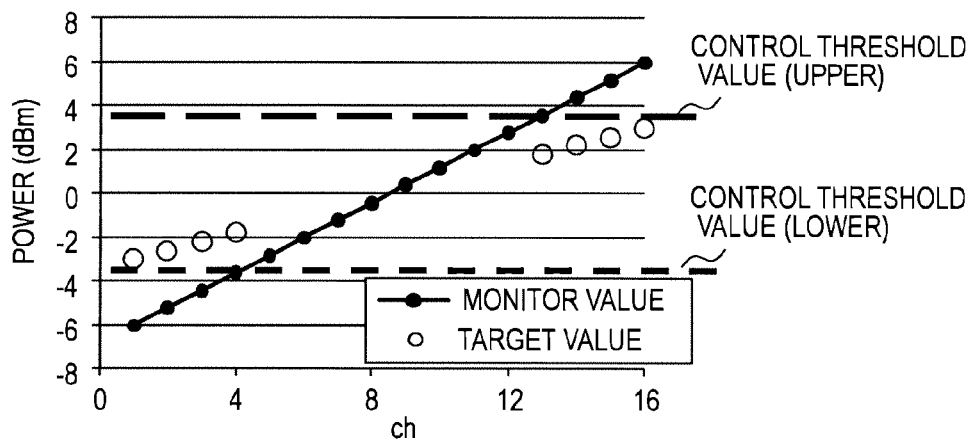
FIG. 14A is an explanatory diagram illustrating the ch-by-ch power monitor values and the ch-by-ch control target values at a monitor node before pre-emphasis control according to the second embodiment of this invention.
Figure 14B:
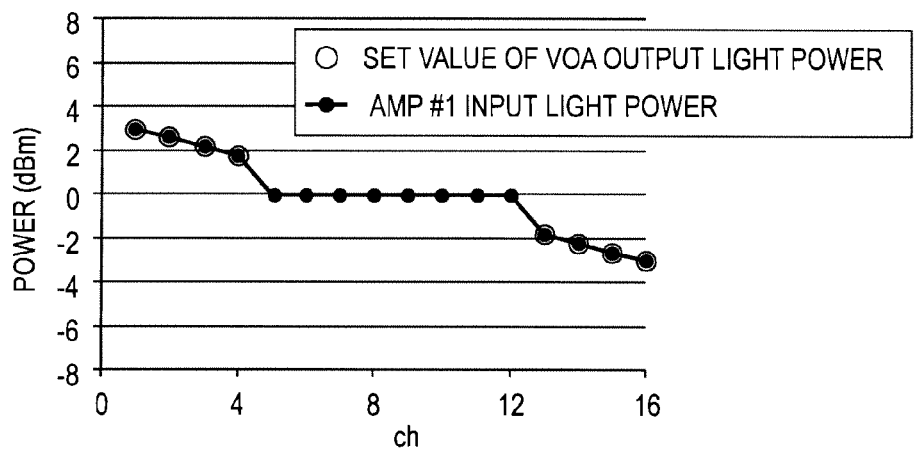
FIG. 14B is an explanatory diagram illustrating optical signal power at a control node after the pre-emphasis control according to the second embodiment of this invention.
Figure 14C:
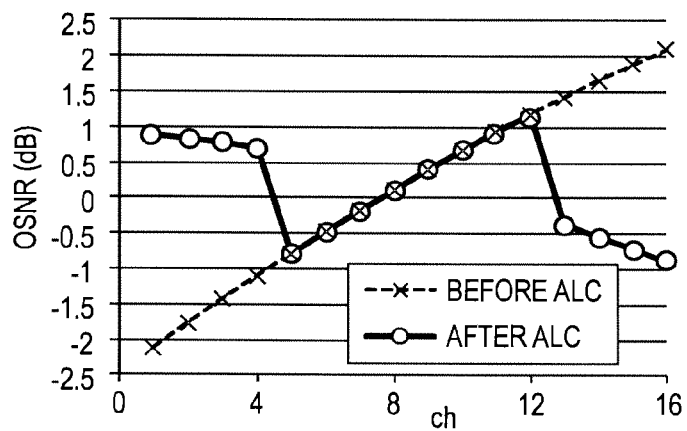
FIG. 14C is an explanatory diagram illustrating OSNR deviation amounts before and after the pre-emphasis control at the monitor node according to the second embodiment of this invention.

FIG. 14A to FIG. 14C are explanatory diagrams illustrating specific examples of the ch-by-ch control target values in a case where the ch-by-ch control target values are calculated based on the ch-by-ch power monitor value 21 as the fixed values according to the second embodiment of this invention.

In other words, FIG. 14A to FIG. 14C illustrate simulation results of the signal light power on a channel-by-channel basis at the control node 101c and the monitor node 101m and the OSNRs, which are obtained in a case where the ch-by-ch control target values illustrated in FIGS. 13A and 13B are calculated by the variable optical attenuator control amount arithmetic circuit 8 illustrated in FIG. 7 and the pre-emphasis control is executed by using the calculated ch-by-ch control target value.

The calculation conditions for the simulation results illustrated in FIG. 14A to FIG. 14C are that the number k of channels is sixteen, the channel numbers are ch1, ch2, . . . , and ch16 in order from the short wavelength side, the number M of coupled optical amplifiers 4 is four, an average gain of the optical amplifiers 4 is 20 decibels, and a noise figure is 7 decibels. The noise figure does not depend on the wavelength. Further, it is assumed that the gain of the optical amplifier 4 has a linear inclination to the wavelength and that the gain deviation amount (Gtilt) with respect to the average gains at the longest wavelength and the shortest wavelength is ±1.5 decibels.

Further, an ALC control condition (pre-emphasis control condition) is that the control threshold value 22 (Pth) is (the center value Pc)±3.5 decibels.

FIG. 14A is an explanatory diagram illustrating the ch-by-ch power monitor values 21 and the ch-by-ch control target values at the monitor node 101m before the pre-emphasis control according to the second embodiment of this invention.

In the case where the ch-by-ch power monitor value 21 exceeds the control threshold value 22, as described above, the ch-by-ch control target value (Ptarget) is calculated by (value of the ch-by-ch power monitor value 21)×½. Here, the ch-by-ch power monitor value 21 is a relative value to the center value Pc (deviation amount from the center value Pc).

Before the pre-emphasis control illustrated in FIG. 14A, the ch-by-ch variable optical attenuators 2 are controlled so that the signal light power of the respective channels at the input point of the optical amplifier 4#1 of the control node 101c becomes equal. The inter-channel deviation of the signal light power, which occurs due to the gain deviation exhibited by the optical amplifiers 4, is proportional to the number of coupled optical amplifiers 4 and accumulates. Therefore, as illustrated in FIG. 14A, the inter-channel deviation amount of the signal light power at the output point of the optical amplifier 4#M of the monitor node 101m is ±6 decibels (as indicated by the black circles in FIG. 14A).

Here, in the case where the ch-by-ch power monitor values 21 for ch1, ch2, ch3, and ch4 fall below the control threshold value 22 on the lower side (indicated by the broken line on the lower side in FIG. 14A), the optical signals at ch1, ch2, ch3, and ch4 are subjected to the pre-emphasis control. On the calculation conditions illustrated in FIG. 10A, the variable optical attenuator control amount arithmetic circuit 8 compares the ch-by-ch power monitor values 21 (indicated by the black circles in FIG. 14A) with the control threshold values 22 (indicated by the broken lines in FIG. 14A), and as a result of the comparison, the new ch-by-ch control target value is calculated for the optical signal at a channel having the ch-by-ch power monitor value 21 that falls outside the range of the control threshold value 22.

In other words, the control target value generating unit 24 of the variable optical attenuator control amount arithmetic circuit 8 calculates the new ch-by-ch control target values (indicated by the white circles in FIG. 14A) corresponding to ch1, ch2, ch3, and ch4 and ch13, ch14, ch15, and ch16 illustrated in FIG. 14A by multiplying the ch-by-ch power monitor values 21 by ½.

FIG. 14B is an explanatory diagram illustrating optical signal power at the control node 101c after the pre-emphasis control according to the second embodiment of this invention.

The comparison arithmetic device 25 calculates the new ch-by-ch variable optical attenuator control amount 26 (indicated by the white circles in FIG. 14B) corresponding to ch1, ch2, ch3, and ch4 and ch13, ch14, ch15, and ch16 from the differences between the ch-by-ch control target values calculated by the control target value generating unit 24 and the ch-by-ch power monitor value 21. In FIG. 14B, in a case where the ch-by-ch variable optical attenuator control amount 26 is negative, the ch-by-ch variable optical attenuator control circuit 12 performs control so as to lower the power levels of the outputs from the ch-by-ch variable optical attenuators 2.

The ch-by-ch variable optical attenuator control amount 26 is transmitted to the ch-by-ch variable optical attenuator control circuit 12 via the supervisory control signal transmitter-receiver 9 and the supervisory control signal transmission line 10. The ch-by-ch variable optical attenuator control circuit 12 controls the attenuation amount of the ch-by-ch variable optical attenuators 2 by using the received ch-by-ch variable optical attenuator control amount 26. As a result, at the input point of the optical amplifier 4#1, the pre-emphasis control is executed on the optical signals at ch1, ch2, ch3, and ch4 and ch13, ch14, ch15, and ch16 as indicated by the black circles in FIG. 14B.

FIG. 14C is an explanatory diagram illustrating the OSNR deviation amounts before and after the pre-emphasis control at the monitor node 101m according to the second embodiment of this invention.

FIG. 14C illustrates the OSNR deviation amounts before and after the ALC control according to the second embodiment (pre-emphasis control according to the second embodiment) which are obtained at the output point of the optical amplifier 4#M included in the monitor node 101m. The OSNR deviation amount illustrated in FIG. 14C exhibits relative values of the OSNRs of the respective channels to an OSNR average of all the channels included in the wavelength-division-multiplexed signal.

The OSNR deviation amount before the pre-emphasis control (indicated by x marks in FIG. 14C) exhibits the maximum value of +2.1 decibels and the minimum value of −2.1 decibels. Therefore, the OSNR deviation amount between channels from the maximum value to the minimum value is 4.2 decibels.

On the other hand, the OSNR deviation amounts at ch1, ch2, ch3, and ch4 increase after the pre-emphasis control (indicated by the white circles in FIG. 14C). This is because the pre-emphasis control is performed to thereby increase the input to the optical amplifier 4#1 and increase the OSNRs at the output point of the optical amplifier 4#M.

In addition, the OSNR deviation amounts at ch13, ch14, ch15, and ch16 reduce after the pre-emphasis control. This is because the pre-emphasis control is performed to thereby reduce the input to the optical amplifier 4#1 and suppress the OSNRs at the output point of the optical amplifier 4#M.

As a result, the maximum value of the OSNR becomes +1.2 decibels, the minimum value becomes −0.9 decibels, and the OSNR deviation amount between channels from the maximum value to the minimum value becomes 2.1 decibels. Accordingly, the OSNR deviation amount after the pre-emphasis control reduces by 2.1 decibels.

As described above, according to the second embodiment, it is possible to provide the pre-emphasis control that suppresses the OSNR deviation between channels by monitoring the signal light power without using an expensive OSNR monitor. Further, the OSNRs after the pre-emphasis control are suppressed to the fixed range at all the channels. This indicates that the pre-emphasis control according to the second embodiment can suppress the OSNR deviation with higher stability than in the first embodiment.

FIG. 15A to FIG. 15E illustrate the simulation results of the OSNR which are obtained at the output point of the optical amplifier 4#M on the same conditions as the calculation conditions of FIG. 14A to FIG. 14C except that only the gain deviation amount of the optical amplifier 4 is changed.

Figure 15A:
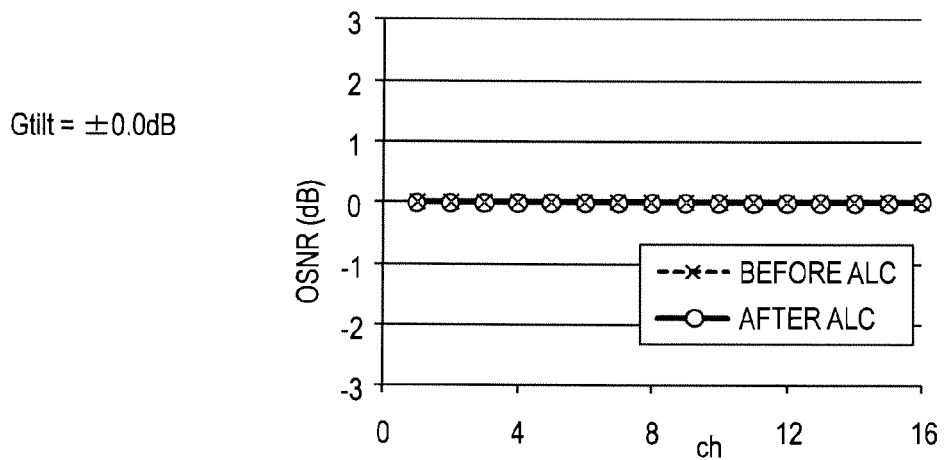
FIG. 15A is an explanatory diagram illustrating the OSNR deviation amounts at an optical amplifier in a case where the gain deviation amount at the optical amplifier is ±0.0 decibels according to the second embodiment of this invention.
Figure 15B:
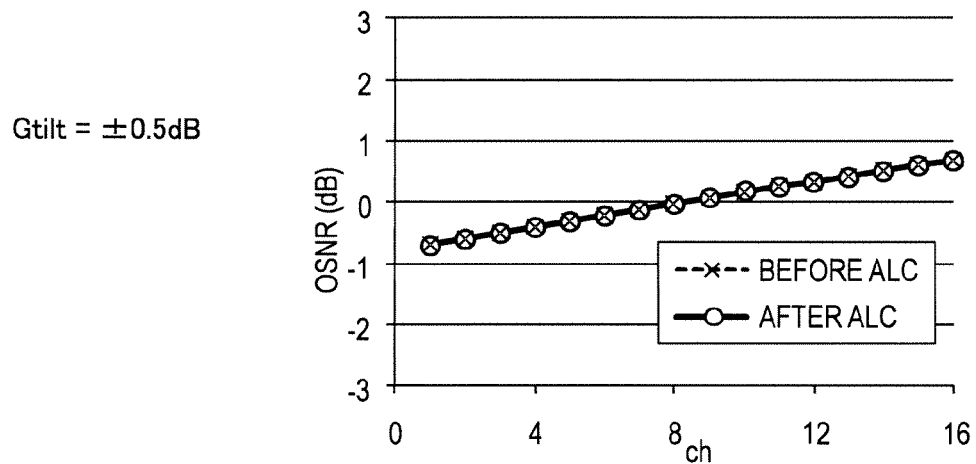
FIG. 15B is an explanatory diagram illustrating the OSNR deviation amounts at the optical amplifier in a case where the gain deviation amount at the optical amplifier is ±0.5 decibels according to the second embodiment of this invention.
Figure 15C:
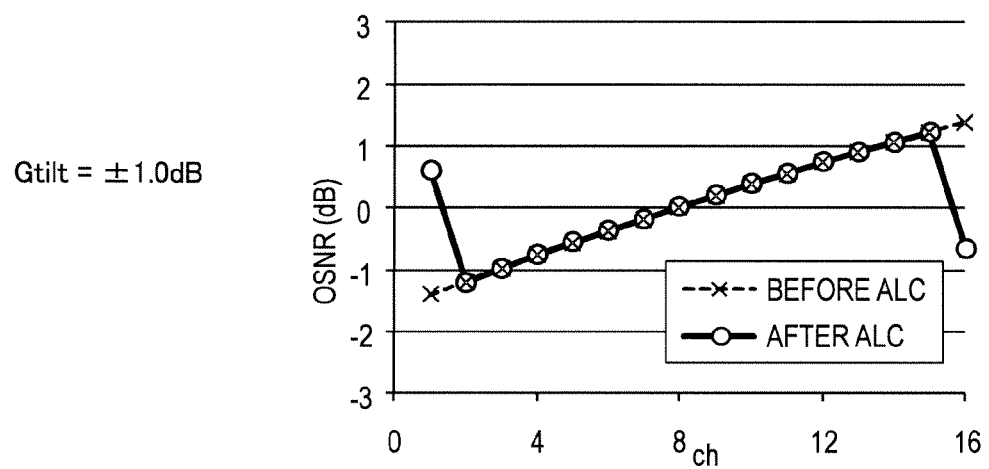
FIG. 15C is an explanatory diagram illustrating the OSNR deviation amounts at the optical amplifier in a case where the gain deviation amount at the optical amplifier is ±1.0 decibel according to the second embodiment of this invention.
Figure 15D:
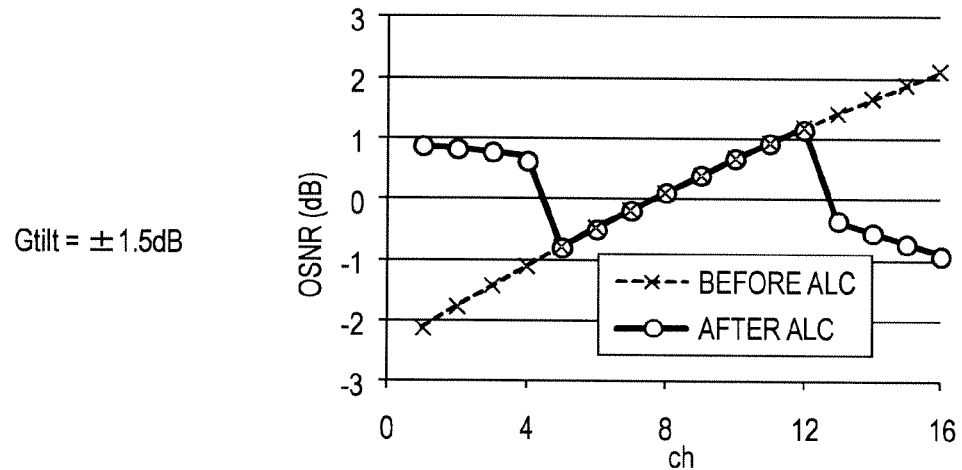
FIG. 15D is an explanatory diagram illustrating the OSNR deviation amounts at the optical amplifier in a case where the gain deviation amount at the optical amplifier is ±1.5 decibels according to the second embodiment of this invention.
Figure 15E:
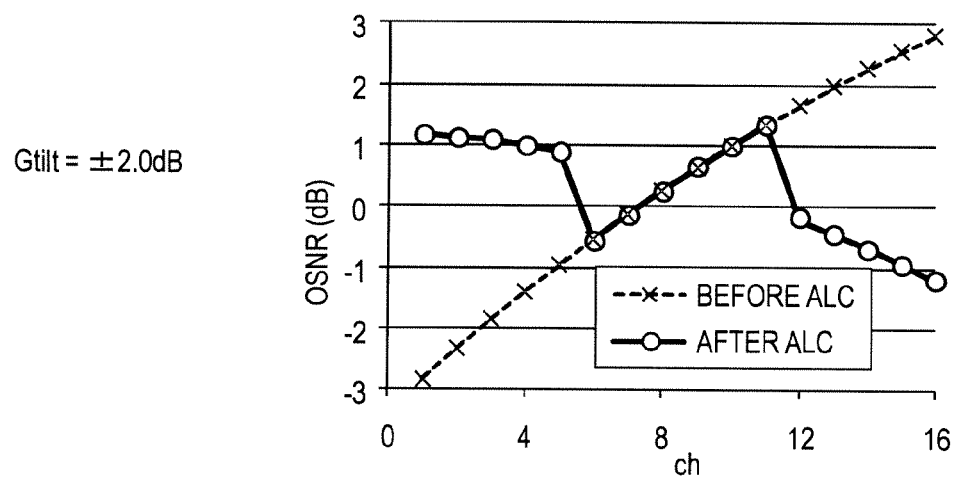
FIG. 15E is an explanatory diagram illustrating the OSNR deviation amounts at the optical amplifier in a case where the gain deviation amount at the optical amplifier is ±2.0 decibels according to the second embodiment of this invention.

In the respective figures, the gain deviation amount of the optical amplifier 4 is ±0.0 decibels in FIG. 15A, ±0.5 decibels in FIG. 15B, ±1.0 decibel in FIG. 15C, ±1.5 decibels in FIG. 15D, and ±2.0 decibels in FIG. 15E.

It should be noted that the channels illustrated in FIG. 15A to illustrated in FIG. 15E are ch1 to ch16. In the wavelength-division-multiplexed signal, ch1 has the shortest wavelength, and ch16 has the longest wavelength.

FIG. 15A is an explanatory diagram illustrating the OSNR deviation amounts at the optical amplifier 4#M in a case where the gain deviation amount at the optical amplifier 4 is ±0.0 decibels according to the second embodiment of this invention.

On the conditions illustrated in FIG. 15A, the gain deviation amount of the optical amplifier 4 is 0, and hence the OSNRs of all the channels are uniform. Thus, the OSNR deviation amounts of all of the channels do not change after the pre-emphasis control.

FIG. 15B is an explanatory diagram illustrating the OSNR deviation amounts at the optical amplifier 4#M in a case where the gain deviation amount at the optical amplifier 4 is ±0.5 decibels according to the second embodiment of this invention.

On the conditions illustrated in FIG. 15B, there exists no channel whose ch-by-ch power monitor value 21 before the pre-emphasis control exceeds the control threshold value 22. Therefore, the OSNR deviation amount between channels after the pre-emphasis control does not change from the OSNR deviation amount between channels before the pre-emphasis control.

FIG. 15C is an explanatory diagram illustrating the OSNR deviation amounts at the optical amplifier 4#M in a case where the gain deviation amount at the optical amplifier 4 is ±1.0 decibel according to the second embodiment of this invention.

On the conditions illustrated in FIG. 15C, the ch-by-ch power monitor values 21 for ch1 and ch16 before the pre-emphasis control fall outside the range of the control threshold value 22. Therefore, the pre-emphasis control is executed on the optical signals at ch1 and ch16. As a result, the OSNR deviation amount between channels after the pre-emphasis control becomes approximately ±1.25 decibels, thereby improving from the OSNR deviation amount between channels before the pre-emphasis control (approximately ±1.5 decibels).

FIG. 15D is an explanatory diagram illustrating the OSNR deviation amounts at the optical amplifier 4#M in a case where the gain deviation amount at the optical amplifier 4 is ±1.5 decibels according to the second embodiment of this invention.

On the conditions illustrated in FIG. 15D, the ch-by-ch power monitor values 21 for ch1, ch2, ch3, and ch4 and ch13, ch14, ch15, and ch16 before the pre-emphasis control fall outside the range of the control threshold value 22. Therefore, the pre-emphasis control is executed on the optical signals at ch1, ch2, ch3, and ch4 and ch13, ch14, ch15, and ch16. As a result, the OSNR deviation amount between channels after the pre-emphasis control becomes approximately ±1.0 decibel, thereby improving from the OSNR deviation amount between channels before the pre-emphasis control (approximately ±2.0 decibels).

FIG. 15E is an explanatory diagram illustrating the OSNR deviation amounts at the optical amplifier 4#M in a case where the gain deviation amount at the optical amplifier 4 is ±2.0 decibels according to the second embodiment of this invention.

On the conditions illustrated in FIG. 15E, the ch-by-ch power monitor values 21 for ch1, ch2, ch3, ch4, and ch5, and ch12, ch13, ch14, ch15, and ch16 before the pre-emphasis control fall outside the range of the control threshold value 22. Therefore, the pre-emphasis control is executed on the optical signals at ch1, ch2, ch3, and ch4, and ch5, and ch12, ch13, ch14, ch15, and ch16. As a result, the OSNR deviation amount between channels after the pre-emphasis control becomes approximately ±1.5 decibel, thereby improving from the OSNR deviation amount between channels before the pre-emphasis control (approximately ±3.0 decibels).

As illustrated in FIG. 12E and FIG. 15E, in the second embodiment, in accordance with the change in the gain deviation amount of the optical amplifier 4, a change amount of the OSNR deviation between channels after the pre-emphasis control is smaller than the change amount of the OSNR deviation according to the first embodiment. Therefore, according to the pre-emphasis control according to the second embodiment, it is possible to suppress the OSNR deviation to a fixed range at any wavelength with higher reliability than the pre-emphasis control according to the first embodiment.

Even in the case where there is a change in the loss amount of the optical signal in the optical fiber 102, the gain deviation between channels may change depending on the change in the gain state within the optical amplifier 4. For example, in the case where the optical amplifier 4 is an erbium doped fiber amplifier, the input light power of the optical amplifier 4 changes as the loss amount in the optical fiber 102 changes. As a result, the population inversion factor (ratio of the number of electrons between the upper laser level and the lower laser level) within the erbium ions changes, and the gain profile with respect to the wavelength of the optical amplifier, in other words, the gain deviation changes. In addition, the general optical amplifier 4 has such a characteristic that the gain on the long wavelength side decreases as the input value with respect to the optical amplifier 4 decreases, while the gain on the short wavelength side decreases as the input value increases.

In other words, as illustrated in FIG. 15A to FIG. 15E, even in the case where there is a change in the gain deviation of the optical amplifier 4, the OSNR deviation amount is suppressed to the fixed range by the pre-emphasis control according to this embodiment, and also in the case where there is a change in the loss amount of the optical fiber 102, the OSNR deviation amount is suppressed to the fixed range.

As described above, according to the second embodiment, the pre-emphasis control that exhibits high stability and high reliability independently of changes in the characteristic parameter of the optical node 101 or the optical fiber 102 is realized in the pre-emphasis control that suppresses the OSNR deviation between channels by monitoring the power levels on a channel-by-channel basis and defining the control target values. In addition, by calculating the ch-by-ch control target values based on the channel-by-channel power levels, it is possible to control the power levels of the wavelength-division-multiplexed signal so that the OSNRs are suppressed to the fixed range at all the channels.

From the invention thus described, it will be obvious that the embodiments of the invention may be varied in many ways. Such variations are not to be regarded as a departure from the spirit and scope of the invention, and all such modifications as would be obvious to one skilled in the art are intended for inclusion within the scope of the following claims.

What is claimed is:

1. An optical transport system, comprising a plurality of optical nodes each of which transmits/receives a wavelength-division-multiplexed signal comprising optical signals of different wavelengths via an optical fiber, the plurality of optical nodes each comprising:
an optical amplifying unit configured to amplify the wavelength-division-multiplexed signal; and
a control signal transmission/reception unit configured to transmit/receive a control signal,
wherein a first optical node in the plurality of optical nodes is configured to transmit the wavelength-division-multiplexed signal to a second optical node in the plurality of optical nodes,
wherein the first optical node comprises an optical control unit configured to change power levels of the wavelength-division-multiplexed signal on a wavelength-by-wavelength basis,
wherein the second optical node comprises:
an optical monitoring unit configured to monitor the power levels of the wavelength-division-multiplexed signal transmitted from the first optical node on a wavelength-by-wavelength basis to acquire wavelength-by-wavelength power level values of the optical signals;
a first comparison arithmetic unit configured to perform a comparison between each of the acquired wavelength-by-wavelength power level values of the optical signals, and a predetermined upper limit value and a predetermined lower limit value;
a target value calculation unit configured to generate wavelength-by-wavelength target values of the power levels of the optical signals based on results of the comparison; and
a second comparison arithmetic unit configured to compare the wavelength-by-wavelength target values of the power levels of the optical signals generated by the target value calculation unit with the wavelength-by-wavelength power level values of the optical signals acquired by the optical monitoring unit, and to calculate control amounts that define change amounts of the power levels of the wavelength-division-multiplexed signal on a wavelength-by-wavelength basis at the first optical node,
wherein the target value calculation unit is configured to:
obtain a center value of the power levels of the wavelength-division-multiplexed signal based on the wavelength-by-wavelength power level values of the optical signals acquired by the optical monitoring unit;
determine target values of power levels at wavelengths whose acquired power level values exceed the predetermined upper limit value as a result of the comparison performed by the first comparison arithmetic unit to be first values between the center value and the predetermined upper limit value for; and
determine target values of power levels at wavelengths whose acquired power level values fall below the predetermined lower limit value as a result of the comparison performed by the first comparison arithmetic unit to be second values between the center value and the predetermined lower limit value, wherein the second optical node comprises a second control signal transmission/reception unit configured to transmit a first control signal comprising the calculated control amounts to a first control signal transmission/reception unit of the first optical node, and wherein the optical control unit of the first optical node is configured to change the power levels of the wavelength-division-multiplexed signal on a wavelength-by-wavelength basis according to the control amounts included in the first control signal transmitted by the second control signal transmission/reception unit.

2. The optical transport system according to claim 1, wherein:

the target value calculation unit is configured to retain preset values for the first values and the second values; and the preset values are independent of the wavelength.

3. The optical transport system according to claim 1, wherein the target value calculation unit is configured to:

retain a function for calculating the first values and the second values; and generate the first values and the second values by inputting the wavelength-by-wavelength power level values of the optical signal into the function.

4. The optical transport system according to claim 3, wherein the function comprises an expression that divides a sum of the wavelength-by-wavelength power level value of the optical signal and the center value by 2.

5. The optical transport system according to claim 1, wherein the target value calculation unit is configured to determine the center value by calculating one of: a value obtained by dividing a sum of a maximum value and a minimum value of the wavelength-by-wavelength power levels of the optical signals by 2; and an average value of the power levels of the optical signals of all the wavelengths within the wavelength-division-multiplexed signal.

6. The optical transport system according to claim 1, wherein the target value calculation unit is configured to:

acquire an output target value of an optical amplifying unit that has transmitted the wavelength-division-multiplexed signal directly to the optical monitoring unit; and set the acquired output target value at the center value.

7. The optical transport system according to claim 1, wherein the plurality of optical nodes comprises a third optical node located between the first optical node and the second optical node, wherein the third optical node comprises a third control signal transmission/reception unit configured to directly receive the first control signal transmitted from the second control signal transmission/reception unit to the first control signal transmission/reception unit, wherein the third control signal transmission/reception unit is configured to transmit a second control signal to the second control signal transmission/reception unit, wherein the second control signal comprises a power level value of the second control signal and an output target value of an optical amplifying unit provided to the third optical node, and wherein the target value calculation unit is configured to:

acquire a span loss by calculating a difference between the power level value of the second control signal included in the second control signal and a power level value of the second control signal at reception by the second control signal transmission/reception unit; and calculate the center value by reducing the output target value of the optical amplifying unit provided to the third optical node included in the second control signal based on the acquired span loss.

8. An optical node configured to transmit/receive a wavelength-division-multiplexed signal comprising optical signals of different wavelengths via an optical fiber comprising:

an optical amplifying unit configured to amplify the wavelength-division-multiplexed signal;

a control signal transmission/reception unit configured to transmit/receive a control signal;

an optical monitoring unit configured to monitor power levels of the wavelength-division-multiplexed signal transmitted from another optical node on a wavelength-by-wavelength basis to acquire wavelength-by-wavelength power level values of the optical signals;

a first comparison arithmetic unit configured to perform a comparison between each of the acquired wavelength-by-wavelength power level values of the optical signals, and a predetermined upper limit value and a predetermined lower limit value;

a target value calculation unit configured to generate wavelength-by-wavelength target values of the power levels of the optical signals based on results of the comparison; and a second comparison arithmetic unit configured to compare the wavelength-by-wavelength target values of the power levels of the optical signals generated by the target value calculation unit with the wavelength-by-wavelength power level values of the optical signals acquired by the optical monitoring unit, and to calculate control amounts that define change amounts of the power levels of the wavelength-division-multiplexed signal on a wavelength-by-wavelength basis at the first optical node, wherein the target value calculation unit is configured to:

obtain a center value of the power levels of the wavelength-division-multiplexed signal based on the wavelength-by-wavelength power level values of the optical signals acquired by the optical monitoring unit;

determine target values of power levels at wavelengths whose acquired power level values exceed the predetermined upper limit value as a result of the comparison performed by the first comparison arithmetic unit to be values between the center value and the predetermined upper limit value; and determine target values of power levels at wavelengths whose acquired power level values fall below the predetermined lower limit value as a result of the comparison performed by the first comparison arithmetic unit to be values between the center value and the predetermined lower limit value, and wherein the control signal transmission/reception unit is configured to transmit a first control signal including the calculated control amounts to a control signal transmission/reception unit of the another optical node for the another optical node to change the power levels of the wavelength-division-multiplexed signal on a wavelength-by-wavelength basis in accordance with the target values.

* * * * *